(12) United States Patent
Stumpf et al.

(10) Patent No.: US 7,210,385 B2
(45) Date of Patent: *May 1, 2007

(54) BEVEL LOCKING SYSTEM FOR A SLIDING COMPOUND MITER SAW

(75) Inventors: William R. Stumpf, Kingsville, MD (US); Mark E. Brunson, Abingdon, MD (US); Scott M. Livingston, Catonsville, MD (US); Michael L. O'Banion, Westminster, MD (US); Robert G. Moores, Jr., Reisterstown, MD (US); John W. Miller, Bel Air, MD (US); Daryl Meredith, Hampstead, MD (US); Thomas Kaye, Bel Air, MD (US); William G. Harman, Jr., Glen Rock, PA (US); Adan Ayala, Joppa, MD (US)

(73) Assignee: Black & Decker Inc., Newark, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/274,464

(22) Filed: Nov. 15, 2005

(65) Prior Publication Data
US 2006/0060048 A1 Mar. 23, 2006

Related U.S. Application Data

(63) Continuation of application No. 10/964,339, filed on Oct. 13, 2004, now Pat. No. 6,990,883, which is a continuation of application No. 10/302,687, filed on Nov. 22, 2002, now Pat. No. 6,823,765, which is a continuation of application No. 09/481,670, filed on Jan. 12, 2000, now Pat. No. 6,520,059, which is a continuation of application No. 09/109,515, filed on Jul. 2, 1998, now Pat. No. 6,032,563, which is a continuation of application No. 08/798,896, filed on Feb. 11, 1997, now Pat. No. 5,907,987, which is a continuation-in-part of application No. 08/761,730, filed on Dec. 5, 1996, now Pat. No. 5,870,938.

(51) Int. Cl.
*B26D 1/14* (2006.01)

(52) U.S. Cl. .................. 83/471.3; 83/473; 83/581; 83/669

(58) Field of Classification Search ............... 83/471.5, 83/473, 581, 699.51, 473.1, 583, 491, 564, 83/490
See application file for complete search history.

(56) References Cited

U.S. PATENT DOCUMENTS 1,030,229 A * 6/1912 Cheney .................. 303/56

(Continued)

*Primary Examiner*—M. Rachuba
(74) *Attorney, Agent, or Firm*—Adan Ayala

(57) ABSTRACT

A compound miter saw includes a table on which a workpiece is placed, a miter saw unit supporting a saw blade, and a housing pivotally supporting the miter saw unit related to the table in such a manner that the miter saw unit is at least laterally pivotable. Further, the miter saw includes a bevel mechanism for selectively determining the lateral position of the miter saw unit at any of a plurality of pivoted positions, including a vertical position where the saw blade is positioned substantially vertically relative to the table, and leftward and rightward pivoted positions where the blade is inclined laterally leftwardly and laterally rightwardly from the vertical position. The bevel mechanism includes a movable rod and three fixed stop members, the rod being operable to move between a first rod position abutting one of the fixed stop members and a second rod position not abutting the one of the fixed stop members so as to permit the lateral pivotal movement of the miter saw unit. The first fixed stop member is disposed so that the rod abuts the first fixed stop member when the miter saw unit is at the vertical position. Similarly, the second fixed stop member is disposed so that the rod abuts the second fixed stop member when the miter saw unit is leftwardly pivoted at a first predetermined angle from the vertical position. Further, the third fixed stop member is disposed so that the rod abuts the third fixed stop member when the miter saw unit is rightwardly pivoted at a second predetermined angle from the vertical position.

5 Claims, 20 Drawing Sheets

U.S. PATENT DOCUMENTS

| | | | | |
|---|---|---|---|---|
| 1,332,881 A * | 3/1920 | Bommer | | 16/279 |
| 1,646,589 A * | 10/1927 | Meek et al. | | 83/471.3 |
| 4,152,961 A * | 5/1979 | Batson | | 83/471.3 |
| 4,221,051 A * | 9/1980 | Glass | | 30/377 |
| 4,452,117 A * | 6/1984 | Brickner et al. | | 83/468 |
| 4,537,105 A * | 8/1985 | Bergler | | 83/471.3 |
| 4,658,681 A * | 4/1987 | Pollak et al. | | 82/115 |
| 4,804,170 A * | 2/1989 | Young et al. | | 267/279 |
| 4,869,142 A * | 9/1989 | Sato et al. | | 83/467.1 |
| 4,934,233 A * | 6/1990 | Brundage et al. | | 83/397 |
| 5,054,352 A * | 10/1991 | Fushiya et al. | | 83/468.3 |
| 5,060,548 A * | 10/1991 | Sato et al. | | 83/471.3 |
| 5,146,826 A * | 9/1992 | Shiotani et al. | | 83/468.2 |
| 5,216,964 A * | 6/1993 | Sato et al. | | 83/471.3 |
| 5,235,889 A * | 8/1993 | Brickner et al. | | 83/471.3 |
| 5,249,496 A * | 10/1993 | Hirsch et al. | | 83/471.3 |
| 5,257,570 A * | 11/1993 | Shiotani et al. | | 83/471.3 |
| 5,329,678 A * | 7/1994 | Bagnasco | | 24/709.4 |
| 5,404,779 A * | 4/1995 | Break | | 83/471.3 |
| 5,437,214 A * | 8/1995 | Sasaki et al. | | 83/471.3 |
| 5,582,089 A * | 12/1996 | Sasaki et al. | | 83/471.3 |
| 5,660,094 A * | 8/1997 | Sasaki et al. | | 83/471.3 |
| 5,862,734 A * | 1/1999 | Brunson et al. | | 83/581 |
| 5,907,987 A * | 6/1999 | Stumpf et al. | | 83/471.3 |
| 6,032,563 A * | 3/2000 | Stumpf et al. | | 83/471.3 |
| 6,101,914 A * | 8/2000 | Brunson et al. | | 83/581 |
| 6,990,883 B2 * | 1/2006 | Stumpf et al. | | 83/471.3 |

\* cited by examiner

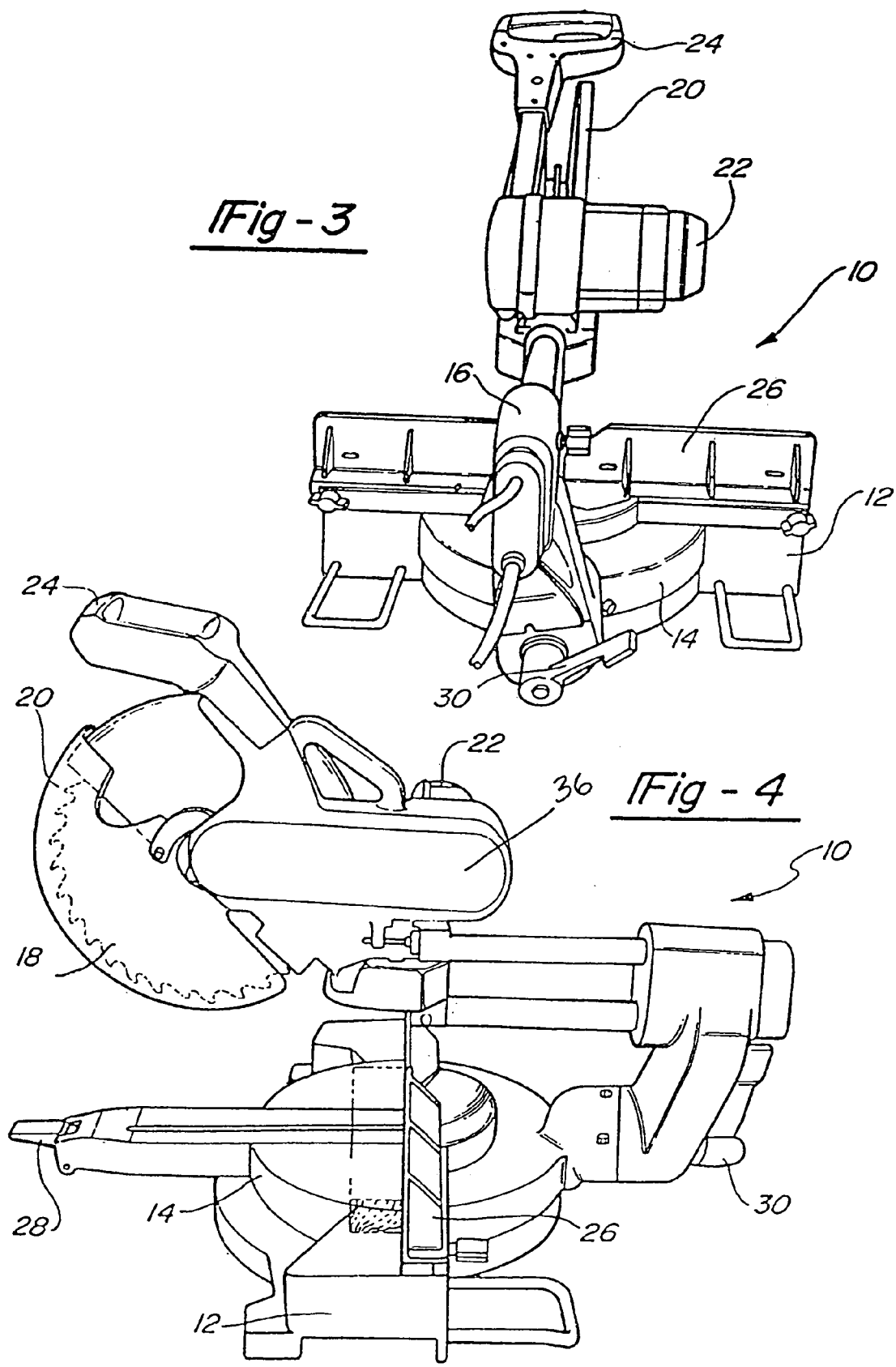

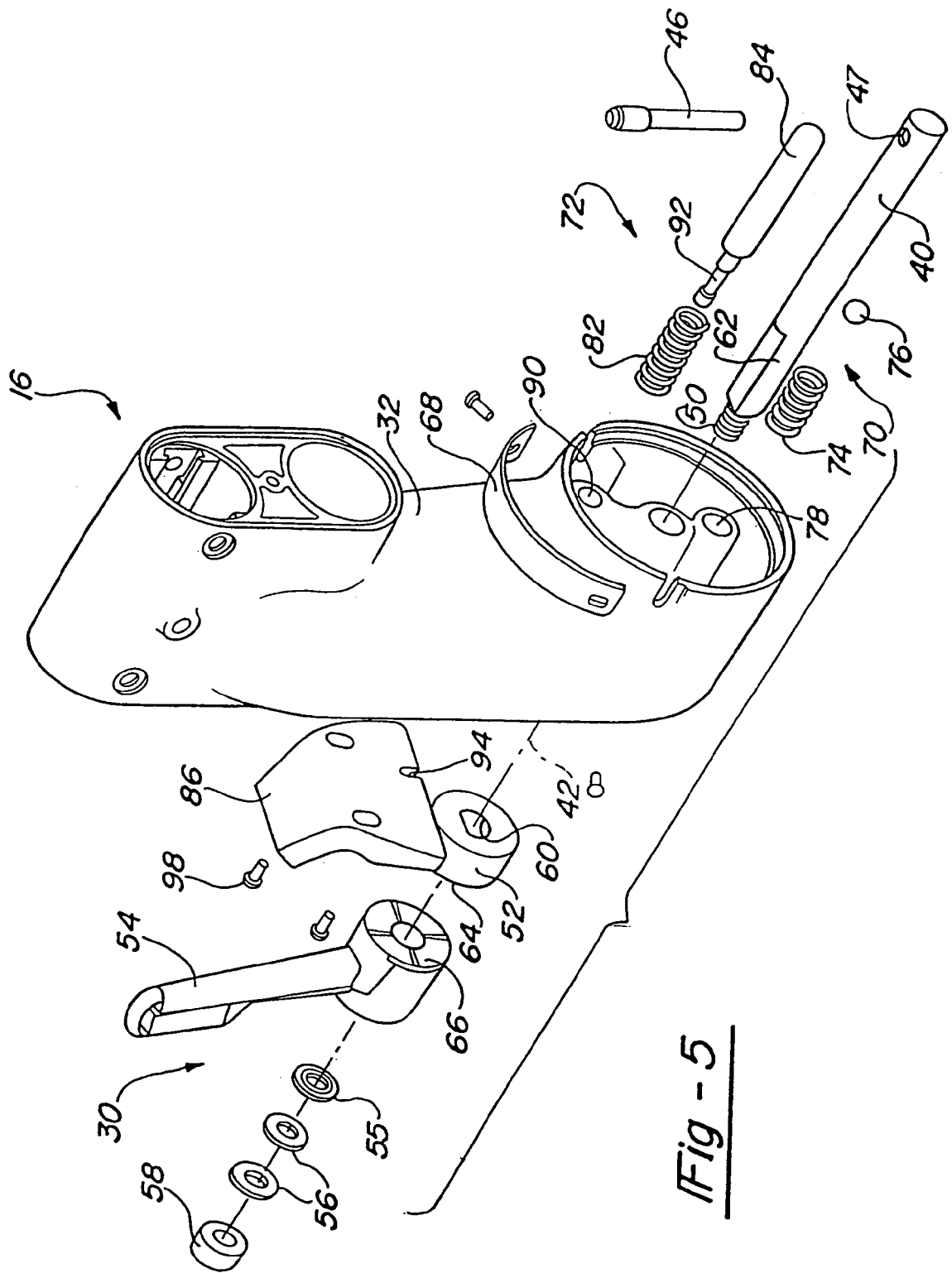

BEVEL LOCKING SYSTEM FOR A SLIDING COMPOUND MITER SAW

This application is a continuation of U.S. Ser. No. 10/964,339, filed Oct. 13, 2004, now U.S. Pat. No. 6,990,883, which is in turn a continuation of U.S. Ser. No. 10/302,687, filed Nov. 22, 2002, now U.S. Pat. No. 6,823,765, which is in turn a continuation of U.S. Ser. No. 09/481,670, filed Jan. 12, 2000, now U.S. Pat. No. 6,520,059, which is in turn a continuation of U.S. Ser. No. 09/109,515, filed Jul. 2, 1998, now U.S. Pat. No. 6,032,563, which in turn is a continuation of U.S. Ser. No. 08/798,896, filed Feb. 11, 1997, now U.S. Pat. No. 5,907,987, which is in turn a continuation-in-part of U.S. Ser. No. 08/761,730, filed Dec. 5, 1996, now U.S. Pat. No. 5,870,938.

FIELD OF THE INVENTION

The present invention relates to compound miter saws or other power operated equipment or machinery utilizing a cutter for performing working operations on a workpiece. More particularly, the present invention relates to improvements in the bevel stop mechanism for the bevel adjustment for such power operated equipment.

BACKGROUND OF THE INVENTION

Saws and other apparatuses designed for cutting or performing other working operations on a workpiece typically require adjustment mechanisms for moving the saw blade or cutting tool into an angular relationship to the workpiece. Examples of such equipment include cross-cut compound miter saws which are adapted for allowing the user to selectively move the saw blade into any of a number of positions or modes for square cutting, miter cutting, bevel cutting, or compound miter cutting where a combination miter angle and bevel angle are cut. In addition, some operations, such as dado cutting or shaping operations, for example, require the use of saw blades or other cutting or working devices of different shapes or sizes to be substituted for one another in order to perform the desired operation on the workpiece, whether the workpiece is composed of wood, plastic, metal other materials.

In order to allow for the adjustment in the miter and the bevel angle, the saw blade, cutter or other working device is angularly adjustable with respect to a horizontal base and a vertical fence against which the workpiece is positioned. The miter adjustment allows the saw blade, cutter or other working device to move angularly with respect to the vertical fence while maintaining perpendicularity with the horizontal base. The bevel adjustment allows the saw blade, cutter or other working device to move angularly with respect to the horizontal base while maintaining perpendicularity with the vertical fence. At times it may be desirable to cut a combination miter angle and bevel angle by simultaneously adjusting the angularity of the blade with respect to both the horizontal base and the vertical fence.

Once the saw blade, cutter or other working device has been adjusted to the desired position with respect to the horizontal base and the vertical fence, locking mechanisms for the miter and bevel adjustment must be activated in order to prohibit movement of the saw blade, cutter or other working device with respect to the base and fence while the cutting operation is performed. These locking mechanisms need to be easily activated, adjustable and quick acting in order to optimize the efficiency of the cutting apparatus and provide convenience to the operator of the apparatus.

It is also advantageous to provide bevel stop mechanisms so that operators can change and easily locate common bevel angles. These bevel stop mechanisms need to be easily engaged and disengaged, adjustable and quick acting in order to optimize the efficiency of the cutting apparatus and provide convenience to the operator of the apparatus.

SUMMARY OF THE INVENTION

In accordance with the present invention, an improved bevel stop is employed in a miter saw. The miter saw includes a table on which a workpiece is placed, a miter saw unit supporting a saw blade and having a motor for rotatably driving the saw blade, and a housing pivotally supporting the miter saw unit related to the table in such a manner that the miter saw unit is at least laterally pivotable. Further, the miter saw includes a bevel mechanism for selectively determining the lateral position of the miter saw unit at any of a plurality of pivoted positions including a vertical position where the saw blade is positioned substantially vertically relative to the table, and leftward and rightward pivoted positions where the blade is inclined laterally leftwardly and laterally rightwardly from the vertical position.

The bevel mechanism includes a movable rod and three fixed stop members, the rod being operable to move between a first rod position abutting one of the fixed stop members and a second rod position not abutting the one of the fixed stop members so as to permit the lateral pivotal movement of the miter saw unit. The first fixed stop member is disposed so that the rod abuts the first fixed stop member when the miter saw unit is at the vertical position. Similarly, the second fixed stop member is disposed so that the rod abuts the second fixed stop member when the miter saw unit is leftwardly pivoted at a first predetermined angle from the vertical position. Further, the third fixed stop member is disposed so that the rod abuts the third fixed stop member when the miter saw unit is rightwardly pivoted at a second predetermined angle from the vertical position.

Other advantages and objects of the present invention will become apparent to those skilled in the art from the subsequent detailed description, appended claims and drawings.

BRIEF DESCRIPTION OF THE DRAWINGS

In the drawings which illustrate the best mode presently contemplated for carrying out the present invention:

FIG. 3 is a rear elevational view of the sliding compound miter saw shown in FIGS. 1 and 2;

FIG. 4 is a side elevational view of the sliding compound miter saw shown in FIGS. 1 through 3;

FIG. 5 is an exploded perspective view of a first embodiment of the bevel stop mechanism in accordance with the present invention;

FIG. 29 is a side view of the pin assembly used in the ninth embodiment of the bevel stop mechanism shown in FIG. 26, where

DETAILED DESCRIPTION OF THE PREFERRED EMBODIMENTS

Figure 1:
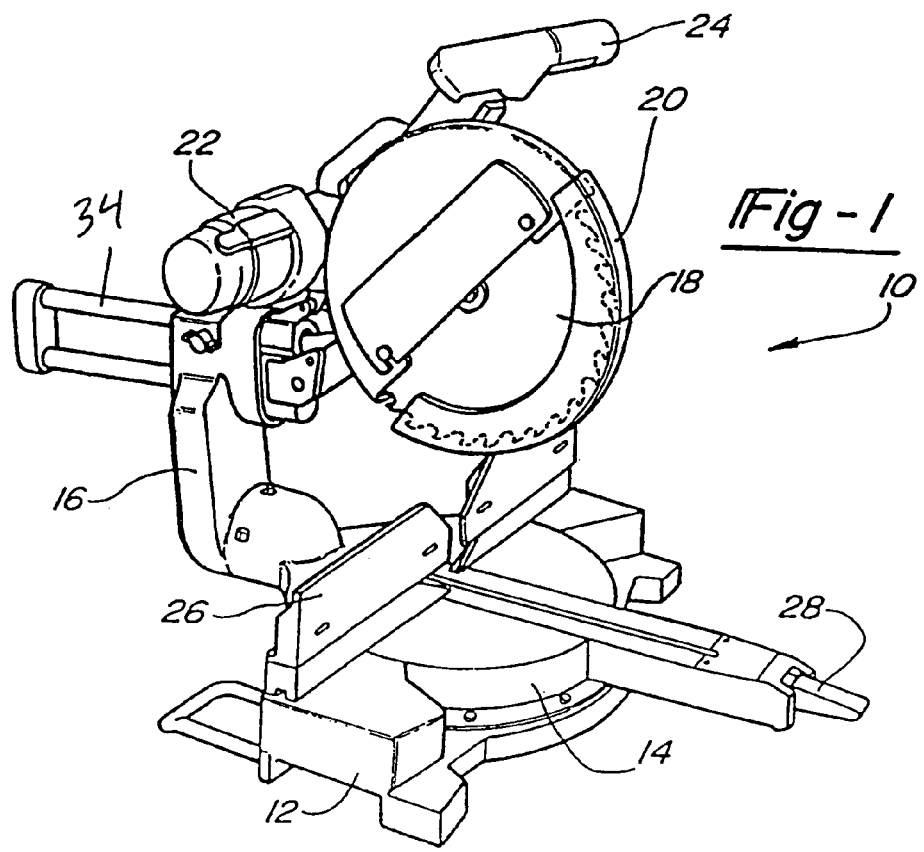
FIG. 1 is a front perspective view of a sliding compound miter saw in accordance with the present invention.
Figure 2:
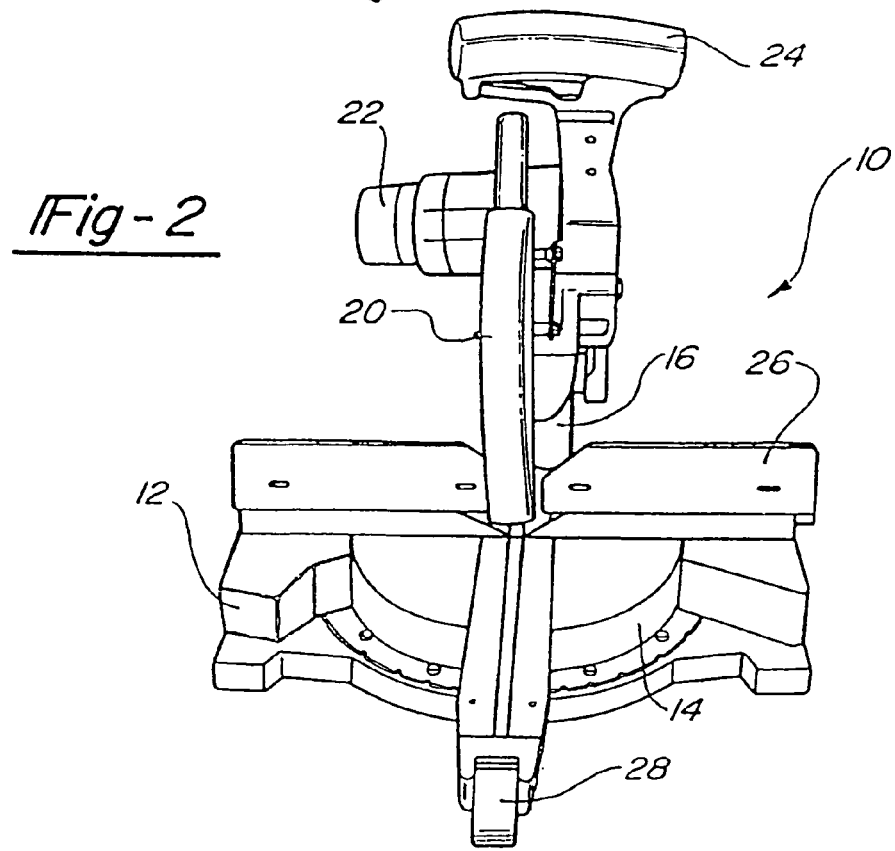
FIG. 2 is a front elevational view of the sliding compound miter saw shown in FIG. 1.

Referring now to the drawings in which like reference numerals designate like or corresponding parts throughout the several views, there is shown in FIGS. 1 through 4 an exemplary sliding compound miter saw incorporating a bevel stop mechanism according to the present invention, shown merely for the purposes of illustration, and designated generally by the reference numeral 10. One skilled in the art will readily recognize from the following description, taken in conjunction with the accompanying drawings and claims, that the principles of the present invention are equally applicable to sliding compound miter saws, compound miter saws, chop saws, radial arm saws, table saws, jigsaws, scroll saws, or other saws of types other than that shown for purposes of illustration in the drawings. Similarly, one skilled in the art will readily recognize that the principles of the bevel stop mechanism according to the present invention are also applicable to other types of powered or unpowered equipment for performing an operation on a workpiece. Such equipment includes, but is not limited to, dado saws, spindle shapers or sanders, or other types of powered or unpowered devices that would benefit from the cam locking mechanism of the present invention.

Referring primarily to FIGS. 1 through 4, sliding compound miter saw 10 comprises a base assembly 12, a table assembly 14, a unique housing assembly 16, a saw blade 18, a blade guard 20, a motor 22 drivingly connected to saw blade 18, a handle 24 and a fence assembly 26. Table assembly 14 is secured to base assembly 12 such that it can be rotated in order to provide adjustment for miter cutting. The rotation of table assembly 14 changes the angle of saw blade 18 relative to fence assembly 26 but maintains the perpendicularity of saw blade 18 with table assembly 14. A locking mechanism 28 can be activated in order to lock table assembly 14 to base assembly 12.

Housing assembly 16 is secured to table assembly 14 such that it can be pivoted with respect to table assembly 14 in order to provide adjustment for bevel cutting. As can be appreciated by one skilled in the art, the adjustments for mitering and beveling can be separate or they can be adjusted simultaneously in order to provide a compound miter and bevel cut. The pivoting of housing assembly 16 changes the angle of saw blade 18 relative to table assembly 14 but maintains the perpendicularity of saw blade 18 with respect fence assembly 26. A locking mechanism 30 can be activated in order to lock housing assembly 16 to table assembly 14 at any desired bevel angle.

Referring to FIGS. 1 through 5, housing assembly 16 includes support housing 32, which mounts a pair of support arms 34 for sliding movement with respect to housing 32. Saw blade 18, blade guard 20, motor 22 and handle 24 are all mounted to a drive housing 36 which is pivotably secured to support arms 34. The pivoting of drive housing 36 downward towards table assembly 14 operates to open blade guard 20 and cut a workpiece which is supported by table assembly 14 and fence assembly 26. The sliding movement of support arm 34 relative to housing 32 permits drive housing 36 and thus saw blade 18 to be pulled through the workpiece when the size of the workpiece exceeds the cutting width of saw blade 18.

Referring now to FIGS. 5 through 8, support housing 32 is pivotably supported with respect to table assembly 14 on a steel shaft 40 which is secured to table assembly 14 and extends rearwardly from table assembly 14 to define a pivot axis 42 for support housing 32. Shaft 40 is inserted into a complimentary bore 44 located within table assembly 14 and is secured in place using a cross pin 46 which extends through a bore 47 extending through shaft 40 and a corresponding set of bores 48 located within table assembly 14 and being generally perpendicular to and extending into bore 44. The end of shaft 40 opposite to the end defining bore 46 includes a threaded stub 50 for retaining and adjusting locking mechanism 30 as will be described later herein.

Locking mechanism 30 comprises a cam 52, a handle 54, a thrust bearing 55, a plurality of washers 56 and a locknut 58. Once support housing 32 is slidingly and pivotably received on shaft 40, cam 52 is slidingly positioned on shaft 40 adjacent support housing 32. Cam 52 includes a D-shaped through bore 60 which mates with a corresponding D-shaped portion 62 of shaft 40 such that cam 52 is allowed to move axially along portion 62 of shaft 40 but rotation of cam 52 with respect to shaft 40 is prohibited. Cam 52 further includes an angular camming surface 64 having a plurality of ramps which is located on the radial surface of cam 52 which is opposite to support housing 32. Camming surface 64 is designed to mate with handle 54 as will be described later herein.

Handle 54 is slidingly and rotatably positioned on shaft 40 adjacent to and outboard of cam 52. Handle 54 includes an angular camming surface 66 having a plurality of ramps which mates with angular camming surface 64 on cam 52. Support housing 32, cam 52 and handle 54 are retained on shaft 40 by thrust washer 55, the plurality of washers 56 and locknut 58 which is threadingly received on stub 50 of shaft 40.

Figure 7:
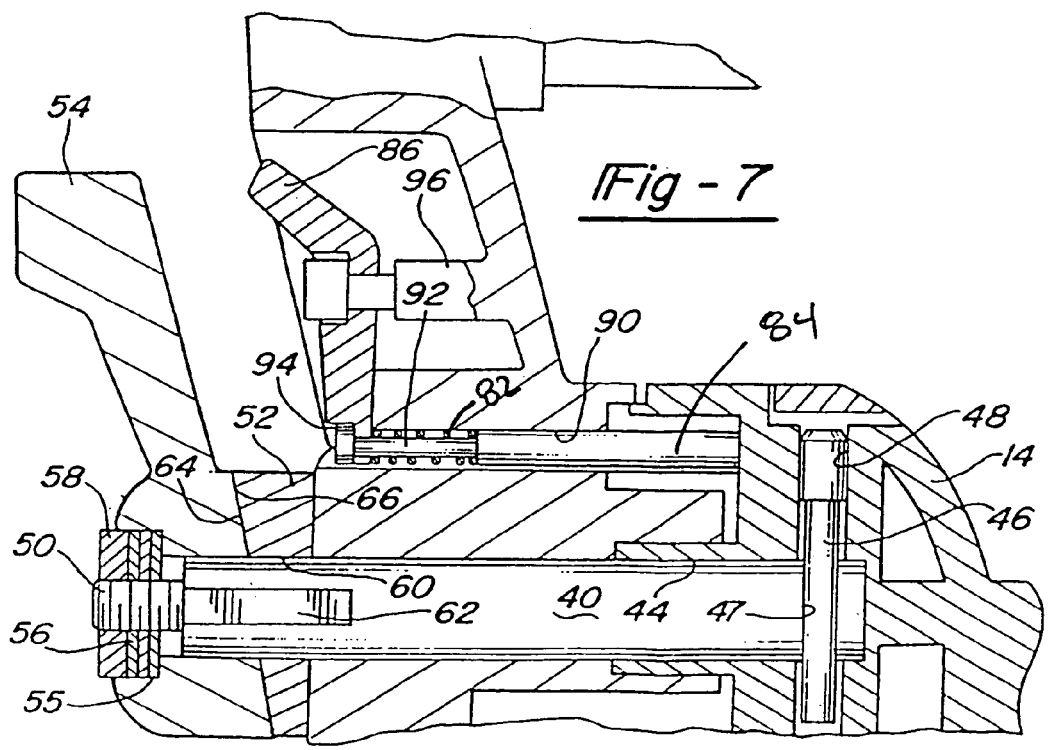
FIG. 7 is a cross-sectional side view of the first embodiment of the bevel stop mechanism shown in FIG. 5.

When angular camming surface 64 and angular camming surface 66 are in full contact with each other as shown in FIG. 7, support housing 32 is free to pivot on shaft 40 to change the bevel angle of saw blade 18. Once the desired bevel angle has been set, handle 54 is rotated with respect to shaft 40. Rotation of handle 54 mis-aligns camming surfaces 64 and 66 pushing support housing 32 and cam 52 axially along shaft 40. Support housing 32 contacts table assembly 14 and continued rotation of handle 54 forces support housing 32 into table assembly 14 locking the two components together. The locking of the two components together can be accomplished by rotating handle 54 in either a clockwise or a counter clockwise direction on order to misalign camming surfaces 64 and 66. This bi-directional locking ability of handle 54 simplifies the adjustment of the bevel angle on opposite sides of center. An indicator plate 68 is bolted to support housing 32 to allow the user to set a specific bevel angle. Indicator plate 68 is provided with a pair of slots which allow for the zero adjustment of plate 68 as is well known in the art.

The present miter saw 10 also incorporates two additional features within housing assembly 16. These two features are a detent system 70 and a positive stop system 72. Detent system 70 includes a biasing spring 74 and a ball 76. Biasing spring 74 and ball 76 are inserted into a blind aperture 78 located within support housing 32. The ends of aperture 78 are formed over ball 76 such that ball 76 is retained within aperture 78 while being biased by spring 74 against the formed ends of aperture 78. Table assembly 14 includes a pair of detents 80, FIG. 8, which are formed into the face of table assembly 14. The position of detents 80 are selected such that ball 76 will drop into detent 80 when the bevel angle for support housing 32 reaches 31.62° either side of center. A bevel angle of 31.62° is desired when miter saw 10 is being set to cut cove molding. While the present invention is illustrated as having only one pair of detents 80, it is within the scope of the present invention to provide additional detents located at additional bevel angles which are commonly used if desired.

Referring to FIGS. 5 through 8, positive stop system 72 comprises a biasing spring 82, a stop rod 84, an override button 86 and an adjustable stop system 88. Biasing spring 82 is inserted into a stepped aperture 90 extending through support housing 32 such that it abuts the step formed within aperture 90. Stop rod 84 is then inserted through spring 82 and through aperture 90 trapping spring 82 between rod 84 and stepped aperture 90. A reduced diameter portion 92 of rod 84 extends through housing 32 and is inserted into a slot 94 formed within override button 86. Override button 86 is pivotably secured to a pair of posts 96 formed as a part of housing 32 by a pair of bolts 98. Once secured to posts 96, pivoting movement of button 86 moves stop rod 84 axially within housing 32 between a stop position and a release position with spring 82 biasing stop rod 84 into its stopped position.

Figure 6:
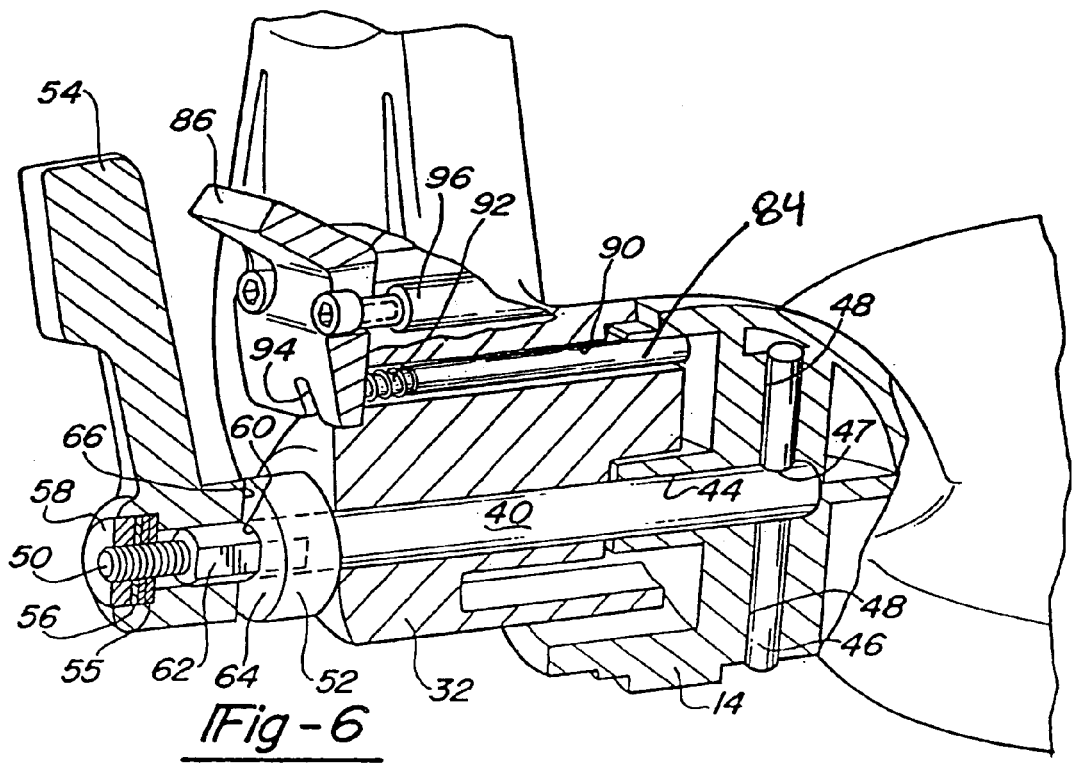
FIG. 6 is an assembled perspective view, partially in cross-section of the first embodiment of the bevel stop mechanism shown in FIG. 5.

Persons skilled in the art will recognize that the spring 82 shown in FIGS. 6 and 7 is a compression spring. Additionally, such persons will recognize that the same function, i.e., biasing stop rod 84 into its stopped position, can be achieved by springs disposed on the button 86 which bias the button towards the stopped position. Further, persons skilled in the art will recognize that other means, such as elastomeric materials and structures, can be utilized to bias the stop rod 84 into its stopped position.

Additionally, persons skilled in the art will recognize that the stop rod 84 moves axially in a direction parallel to the axis of rotation 42. However, such persons will also recognize that the stop rod 84 can be inclined in any manner, so long as it can contact the bolt 100.

Figure 8:
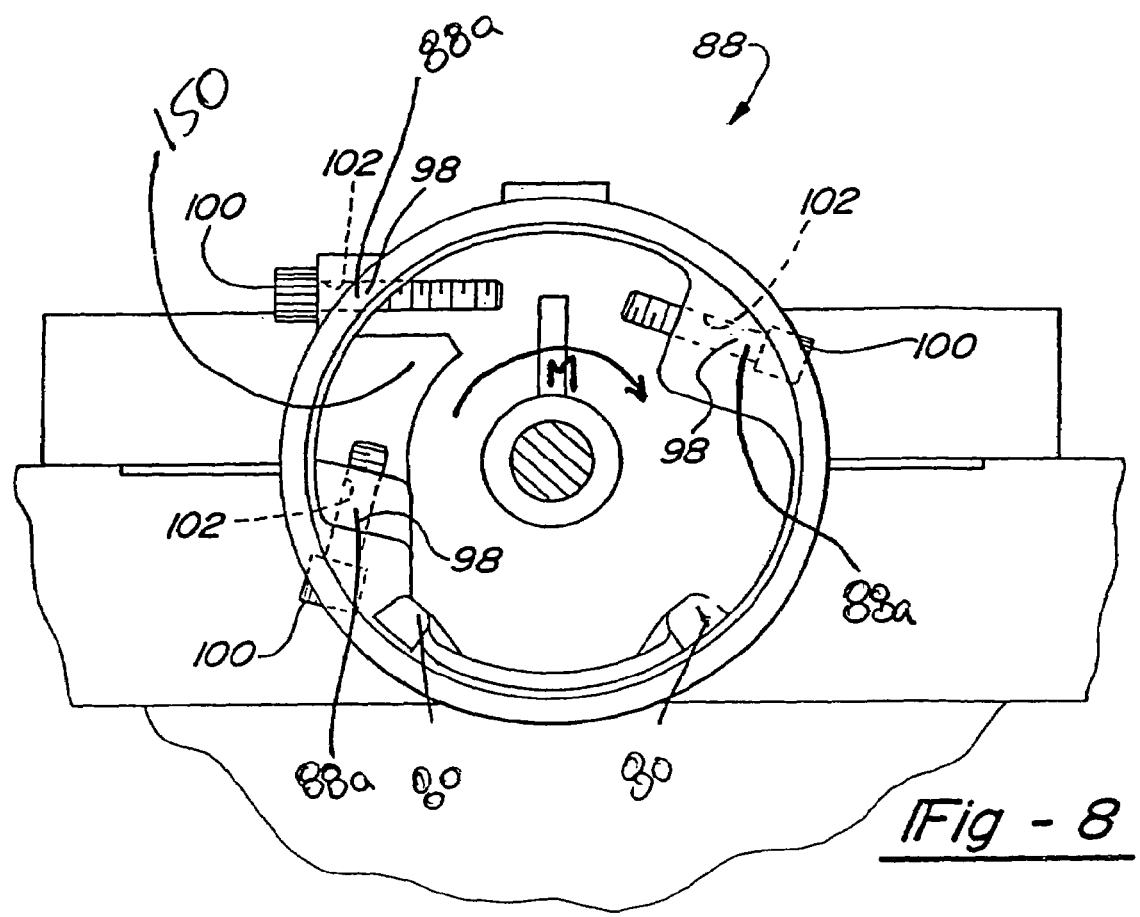
FIG. 8 is an end view of the base or table assembly illustrating a first embodiment of the adjustment feature provided for the bevel stop mechanism shown in FIG. 5.

When located in its stopped position, stop rod 84 extends out of housing 32 and into table assembly 14 such that it can engage one of the plurality of adjustable stops 88a shown in FIG. 8. Table assembly 14 is shown having an adjustable stop 88a located at a 0° bevel angle and at a bevel angle of 45° on both sides of center. Each adjustable stop 88a includes a housing 98 and a threaded stop bolt 100. Each housing 98 is shown as an integral part of table assembly 14 but it is within the scope of the present invention to manufacture individual housings 98 and secure them to table assembly 14 if desired. Each housing 98 defines a threaded through bore 102 into which stop bolt 100 is threadably received. Threaded stop bolt 100 provides a surface for stop rod 84 to contact when the bevel angle of housing 32 is located at about 0° or about ±45° from the 0° bevel angle as is shown in the preferred embodiment. The adjustability of each stop 88a is provided by the threaded connection between bolt 100 and housing 98 and this adjustability allows the operator to accurately set these specific bevel angles. When the bevel angle needs to be changed, handle 54 is rotated to release housing 32 from table assembly 14 and override button 86 is pivoted on posts 96 to withdraw stop rod 84 from within table assembly 14 to a position at which stop rod 84 does not contact bolt 100 or housing 98 when housing 32 is pivoted on shaft 40.

Persons skilled in the art will recognize that the adjustable stops 88a may be replaced with fixed castings on the table assembly 14. This will provide a mechanism to stop the stop rod 84 at a lower manufacturing cost.

The table assembly 14 may further be provided with a ramp 150. The ramp 150 contacts the stop rod 84 when the miter saw is beveled in a clockwise direction M, i.e., from the −45° bevel angle towards the +45° bevel angle, so that the stop rod 84 retracts and bypasses the 0° bolt.

Figure 9:
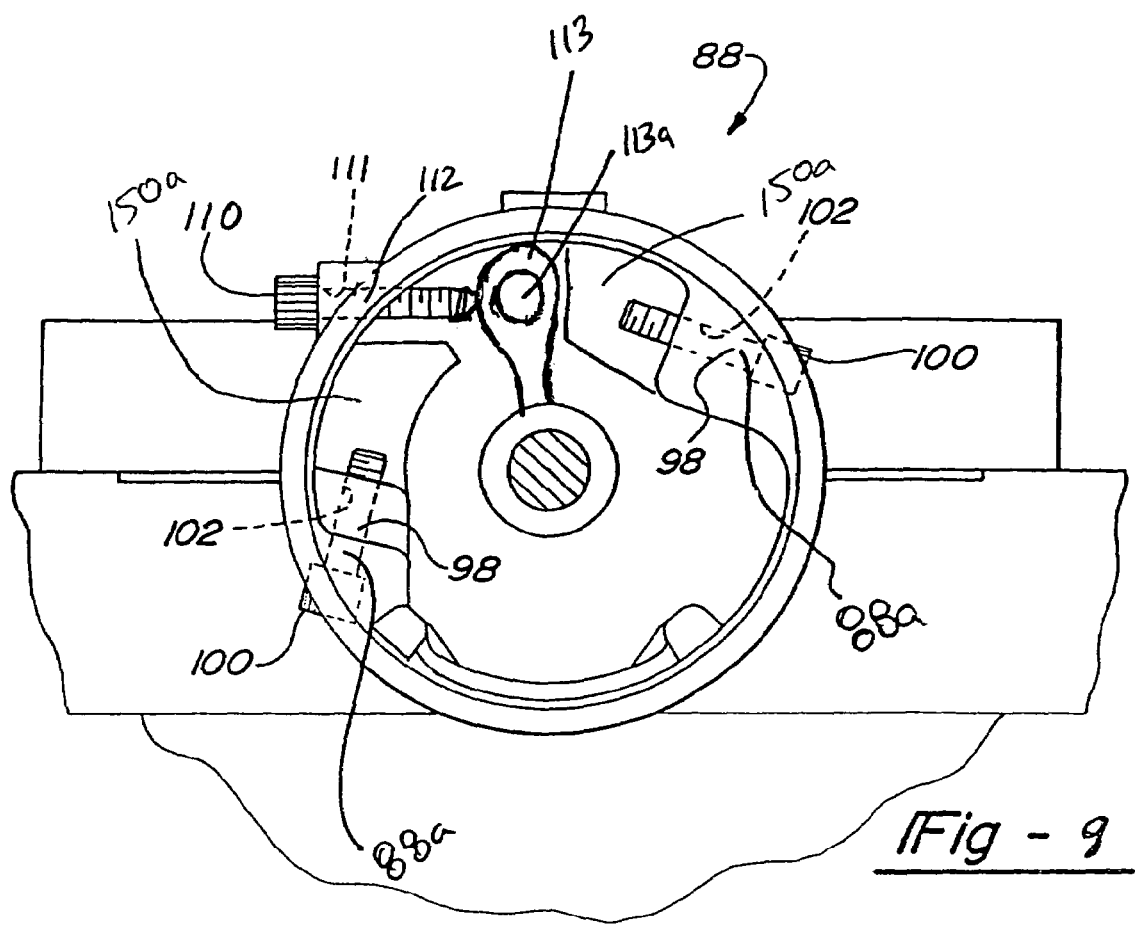
FIG. 9 is an end view of the base or table assembly illustrating a second embodiment of the adjustment feature provided for the bevel stop mechanism shown in FIG. 5.

FIG. 9 illustrates a different adjustable stop system 88, which can be used in conjunction with the other elements of the positive stop system 72. Table assembly 14 is shown having an adjustable stop 88a located at about a bevel angle of 45° on both sides of center, having the same function and adjustability as described above. In addition, an adjustable guide plate 113 is provided to stop the stop rod 84 when the bevel angle of the housing 32 is located at about 0°. The guide plate 113 is preferably connected to an adjustment bolt 110.

The adjustment bolt 110 includes a housing 112. Each housing 112 is shown as an integral part of table assembly 14 but it is within the scope of the present invention to manufacture individual housings 112 and secure them to table assembly 14 if desired. Each housing 112 defines a threaded through bore 111 into which bolt 110 is threadably received. The adjustability of the adjustment bolt 110 (and thus of the guide plate 113) is provided by the threaded connection between bolt 100 and housing 98. This adjustability allows the operator to accurately set the position of the guide plate 113, and thus the specific bevel angle.

The table assembly 14 may further be provided with ramps 150a. The ramps 150a contact the stop rod 84 when the miter saw is beveled back to the vertical position, i.e., from the ±45° bevel angles to the 0° bevel angle, so that the stop rod 84 retracts and slides onto guide plate 113. The stop rod 84 then engages the guide plate 113 by extending into hole 113a. When the bevel angles needs to be changed, handle 54 is rotated to release housing 32 from table assembly 14 and override button 86 is pivoted on posts 96 to withdraw stop rod 84 from within table assembly 14 to a position at which stop rod 84 does not engage guide plate 113 via hole 113a when housing 32 is pivoted on shaft 40.

Figure 10:
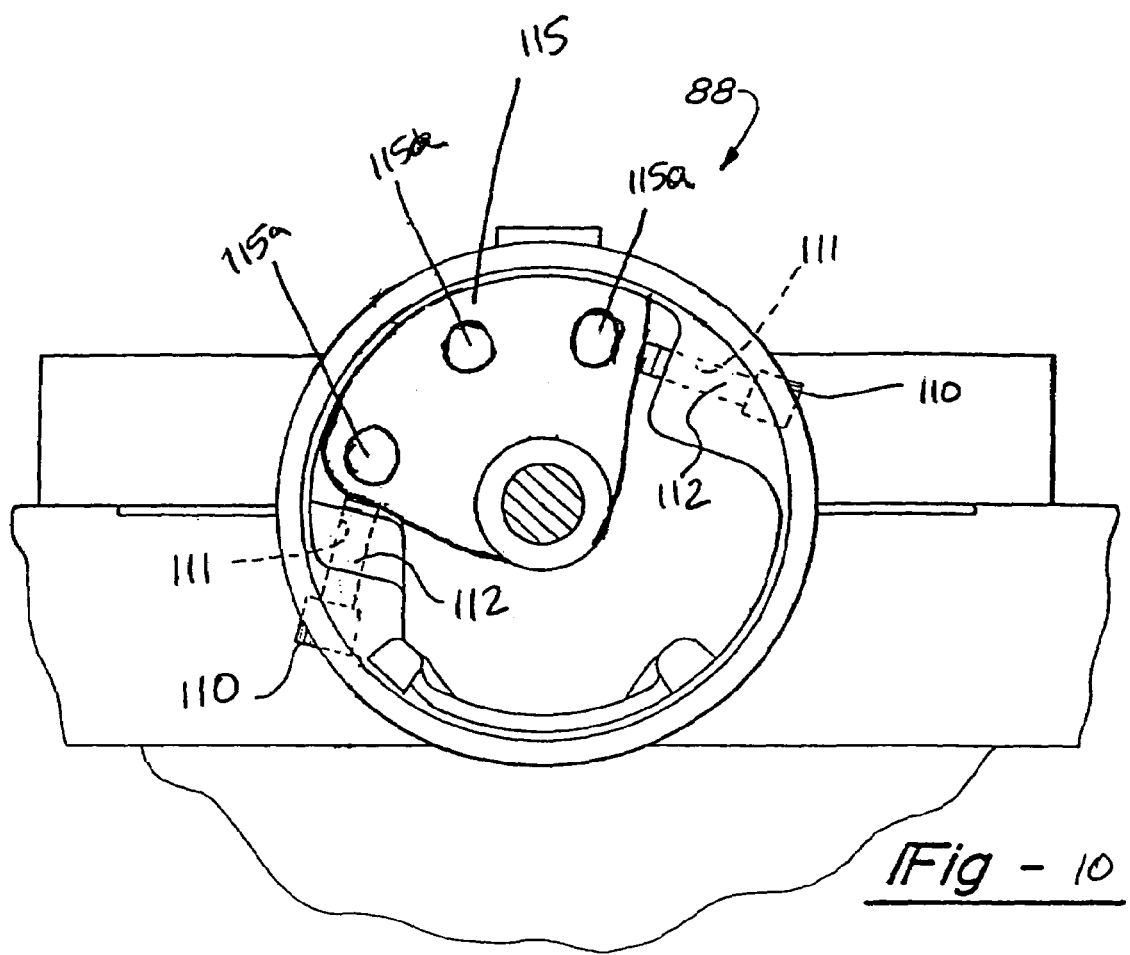
FIG. 10 is an end view of the base or table assembly illustrating a third embodiment of the adjustment feature provided for the bevel stop mechanism shown in FIG. 5.

FIG. 10 illustrates yet another adjustable stop system 88, which can be used in conjunction with the other elements of the positive stop system 72. Like the stop system shown in FIG. 9, this system has an adjustable guide plate 115. The guide plate 115 is preferably connected to at least one adjustment bolt 110. Unlike the guide plate 113, the guide plate 115 has a plurality of holes 115a, for the stop rod 84 to contact when the bevel angle of housing 32 is located at about 0° or about ±45° from the 0° bevel angle. Nevertheless, operation of the system is substantially similar to the stop system of FIG. 9.

Figure 11:
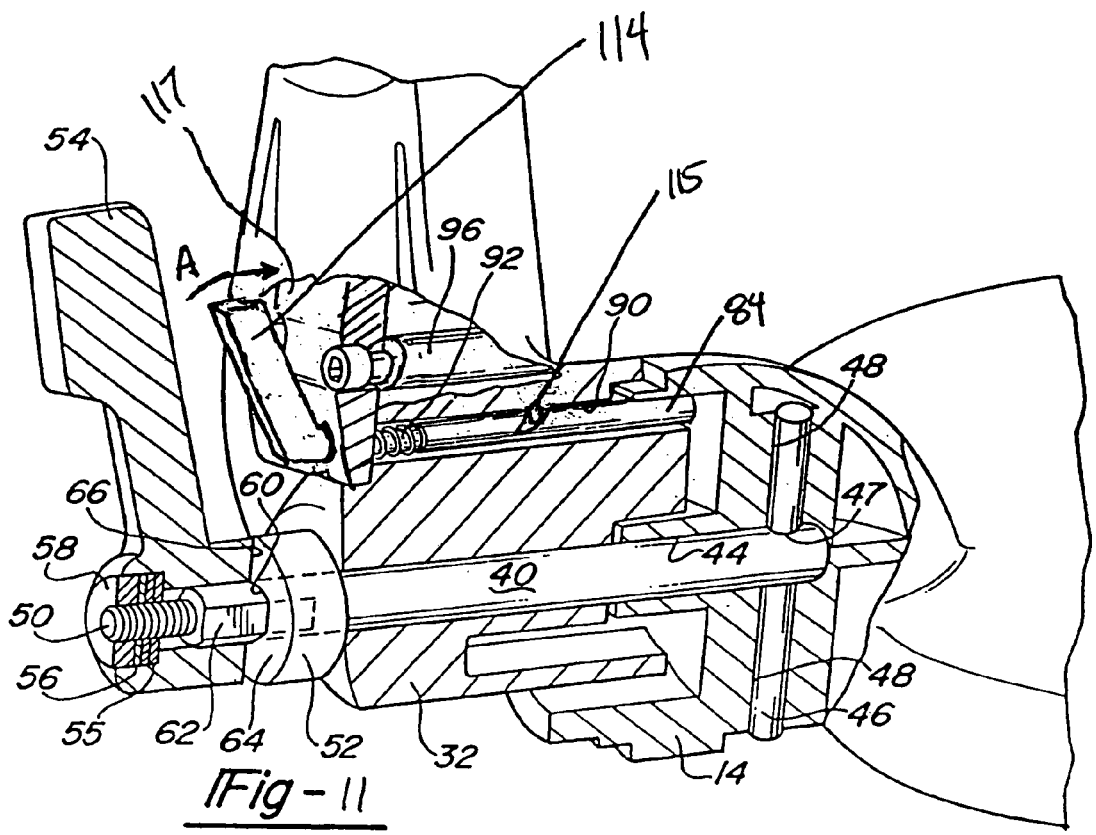
FIG. 11 is a partial cross-section perspective view of a second embodiment of the bevel stop mechanism.
Figure 12:
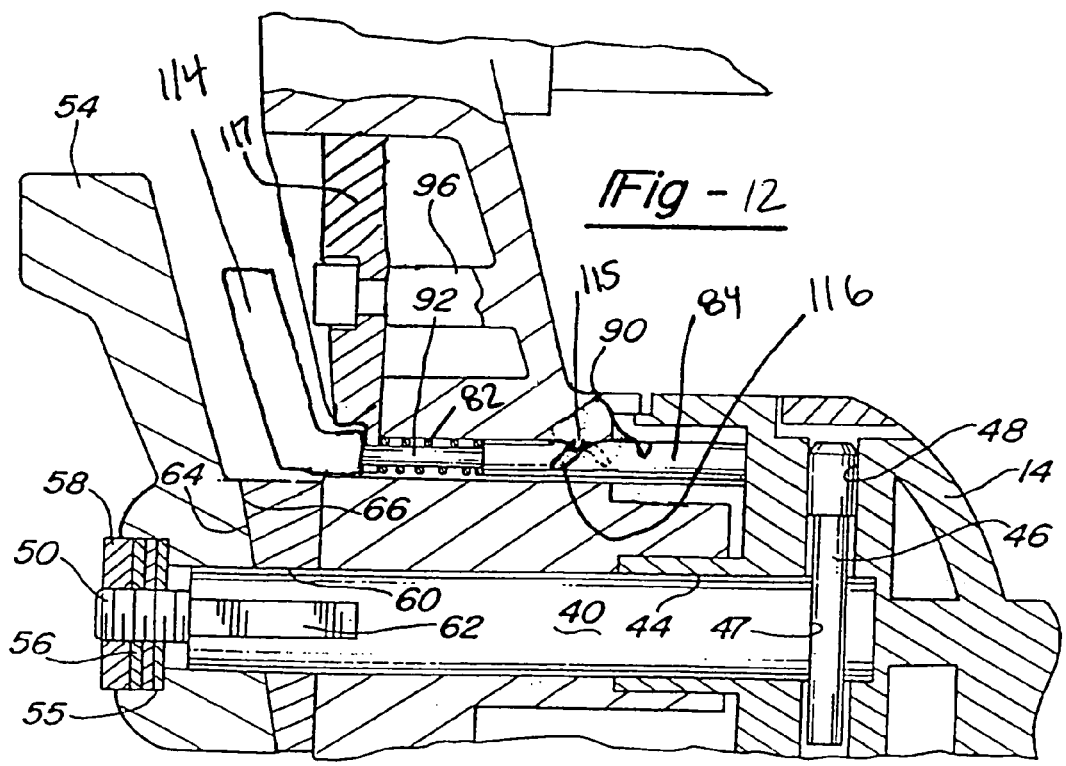
FIG. 12 is a cross-sectional side view of the second embodiment of the bevel stop mechanism shown in FIG. 11.

Referring to FIGS. 11 and 12, a second embodiment of positive stop system 72 comprises a biasing spring 82, a stop rod 84, an override handle 114 and a stop system, preferably one of the stop systems shown in FIGS. 8 through 10. Biasing spring 82 is inserted into a stepped aperture 90 extending through the housing 32 such that it abuts the step formed within aperture 90. Stop rod 84 is then inserted through spring 82 and through aperture 90. The housing 32 has a plaque 117, which may be built separate to or integrated with the housing 32. Spring 82 is trapped between plaque 117 and the stop rod 84.

A reduced diameter portion 92 of rod 84 extends through housing 32 and is inserted through a slot in plaque 117. An override handle 114 is then attached to the portion of rod 84 extending through plaque 117.

Further, stop rod 84 has a helical groove 116 disposed on its body, that engages a stop 115 in housing 32. Accordingly, rotational movement of handle 114, for example, in a clockwise direction, i.e., along direction A, rotates stop rod 84. Because of the engagement between the stop 115 and the rod groove 116, stop rod 84 moves axially while rotating, as in a screwing action, within housing 32 between a stop position and a release position with spring 82 biasing stop rod 84 into its stopped position.

Persons skilled in the art will recognize that the spring 82 shown in FIGS. 11 and 12 is a compression spring. Additionally, such persons will recognize that the same function, i.e., biasing stop rod 84 into its stopped position, can be achieved by rotational springs disposed on the stop rod 84 and/or handle 114, which force the rod 84 to rotate towards the stopped position. Further, persons skilled in the art will recognize that other means, such as elastomeric materials and structures, can be utilized to bias the stop rod 84 into its stopped position.

Figure 13:
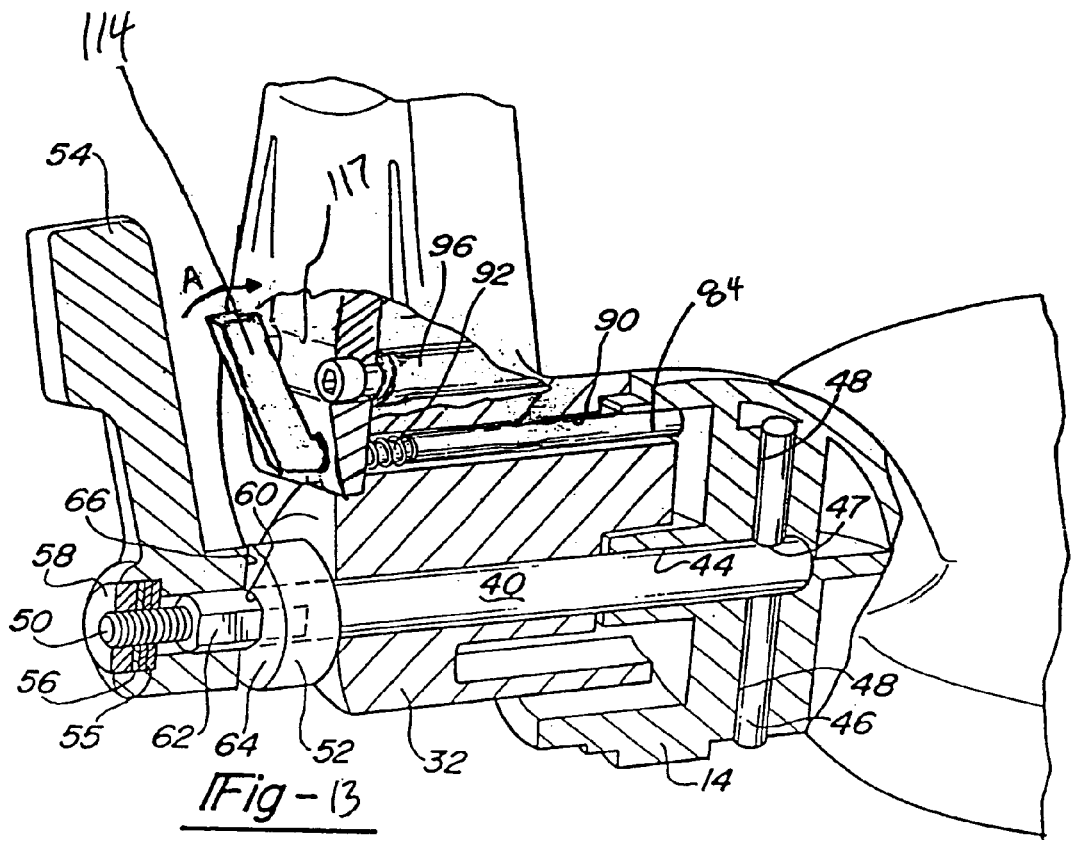
FIG. 13 is a partial cross-section perspective view of a third embodiment of the bevel stop mechanism.
Figure 14:
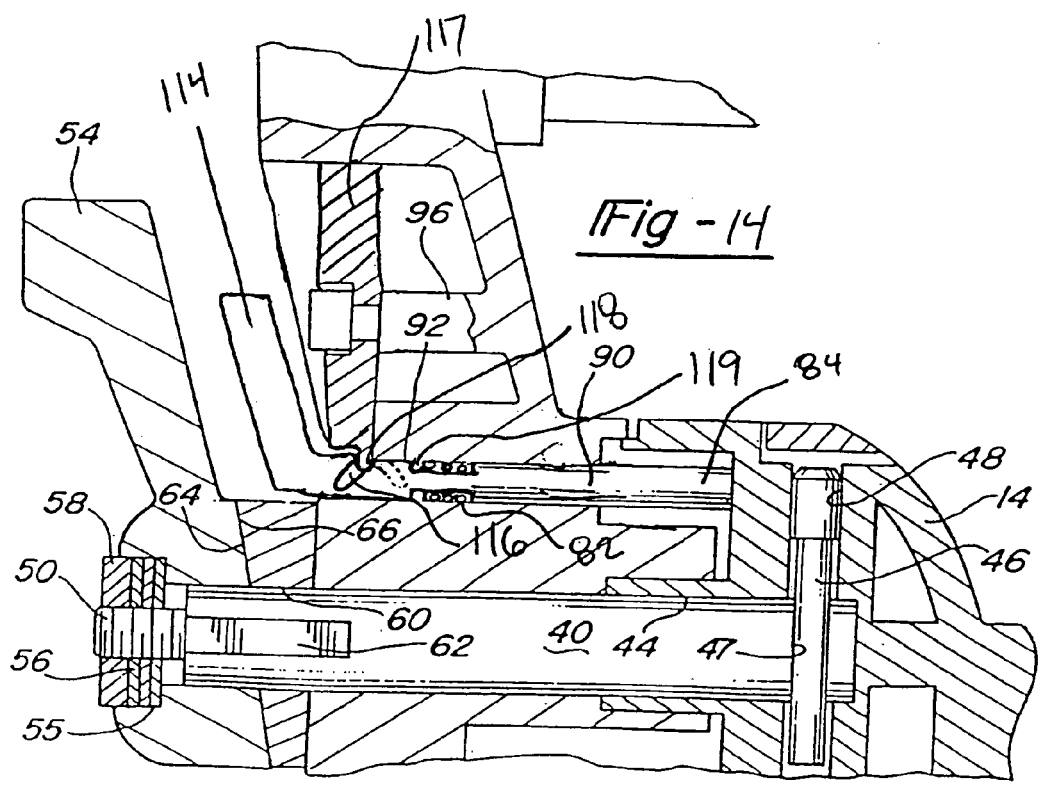
FIG. 14 is a cross-sectional side view of the third embodiment of the bevel stop mechanism shown in FIG. 13.

Referring to FIGS. 13 and 14, a third embodiment of positive stop system 72 comprises, like the embodiment illustrated in FIGS. 11 and 12, a biasing spring 82, a stop rod 84, an override handle 114 and a stop system, preferably one of the stop systems shown in FIGS. 8 through 10. The arrangement and operation of the third embodiment is similar to the one illustrated in FIGS. 11 and 12. Accordingly, the description of the second embodiment should be referred to when studying this embodiment.

Unlike in the second embodiment, a separate stop 119 is preferably disposed in the housing 32. Spring 82 is then trapped between stop 119 and the stop rod 84. Further, the helical groove 116 is disposed towards the rear of stop rod 84, so that it can engage a stop 118 disposed in plaque 117. Nevertheless, operation of the third embodiment is similar to that of the embodiment shown in FIGS. 11 and 12.

Figure 15:
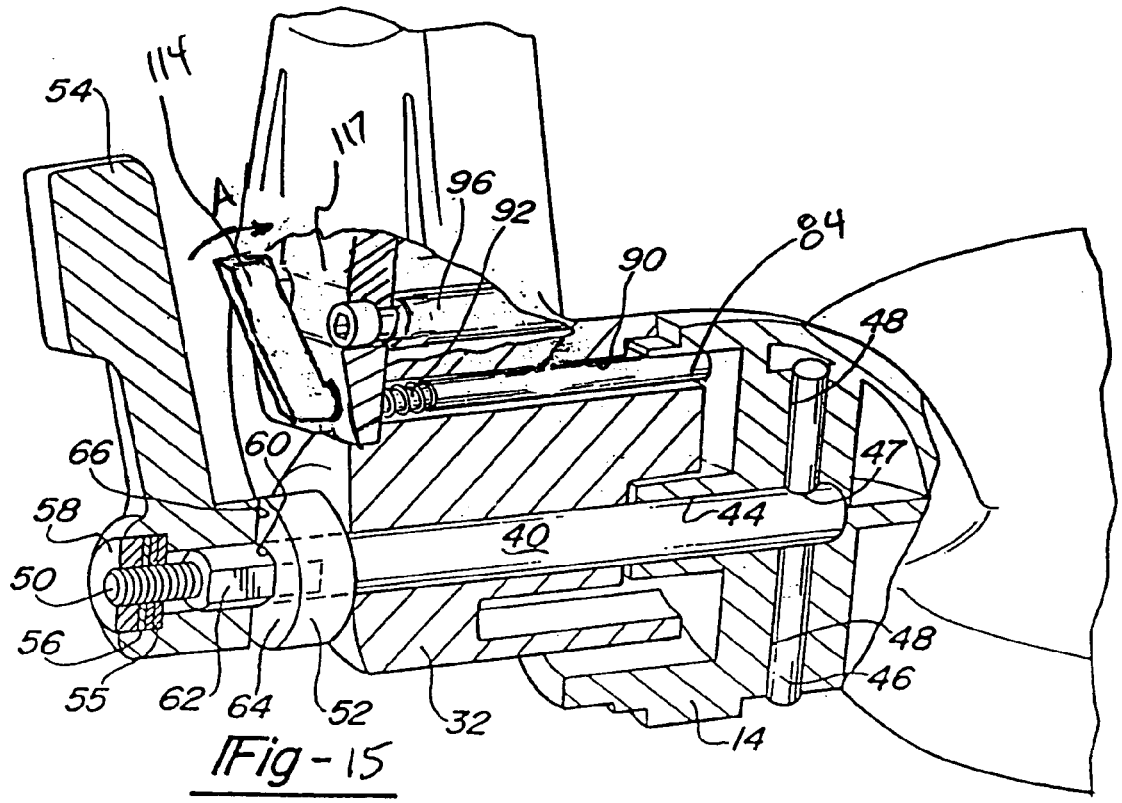
FIG. 15 is a partial cross-section perspective view of a fourth embodiment of the bevel stop mechanism.
Figure 16:
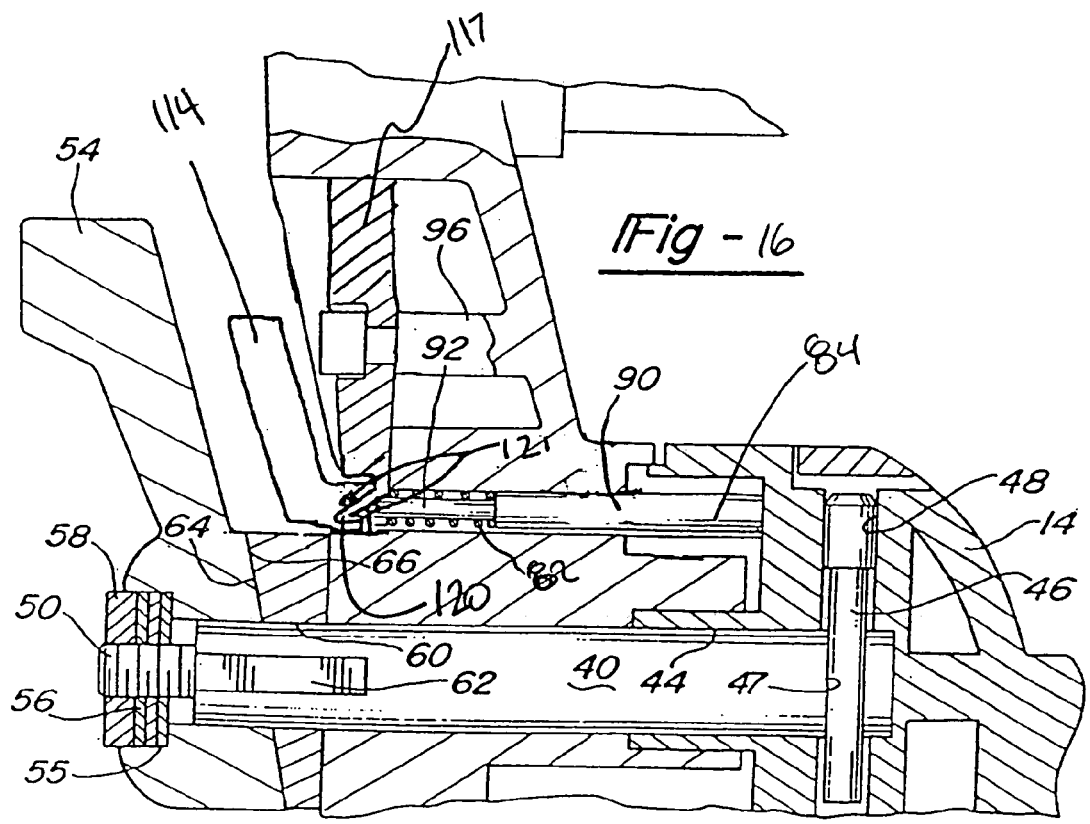
FIG. 16 is a cross-sectional side view of the fourth embodiment of the bevel stop mechanism shown in FIG. 15.

Referring to FIGS. 15 and 16, a fourth embodiment of positive stop system 72 comprises, like the embodiment illustrated in FIGS. 11 and 12, a biasing spring 82, a stop rod 84, an override handle 114 and a stop system, preferably one of the stop systems shown in FIGS. 8 through 10. The arrangement and operation of the fourth embodiment is similar to the one illustrated in FIGS. 11 and 12. Accordingly, the description of the second embodiment should be referred to when studying this embodiment.

Unlike in the second embodiment, plaque 117 is provided with guide 120. Furthermore, stop rod 84 is provided with two pins 121, which form a channel, or thread, that engages guide 120. The combination of the pins 121 and guide 120 provide the same function as the combination of the helical groove 116 and stop 115, i.e., convert rotational handle movement into axial stop rod movement. Accordingly, operation of the fourth embodiment is similar to that of the embodiment shown in FIGS. 11 and 12.

Figure 17:
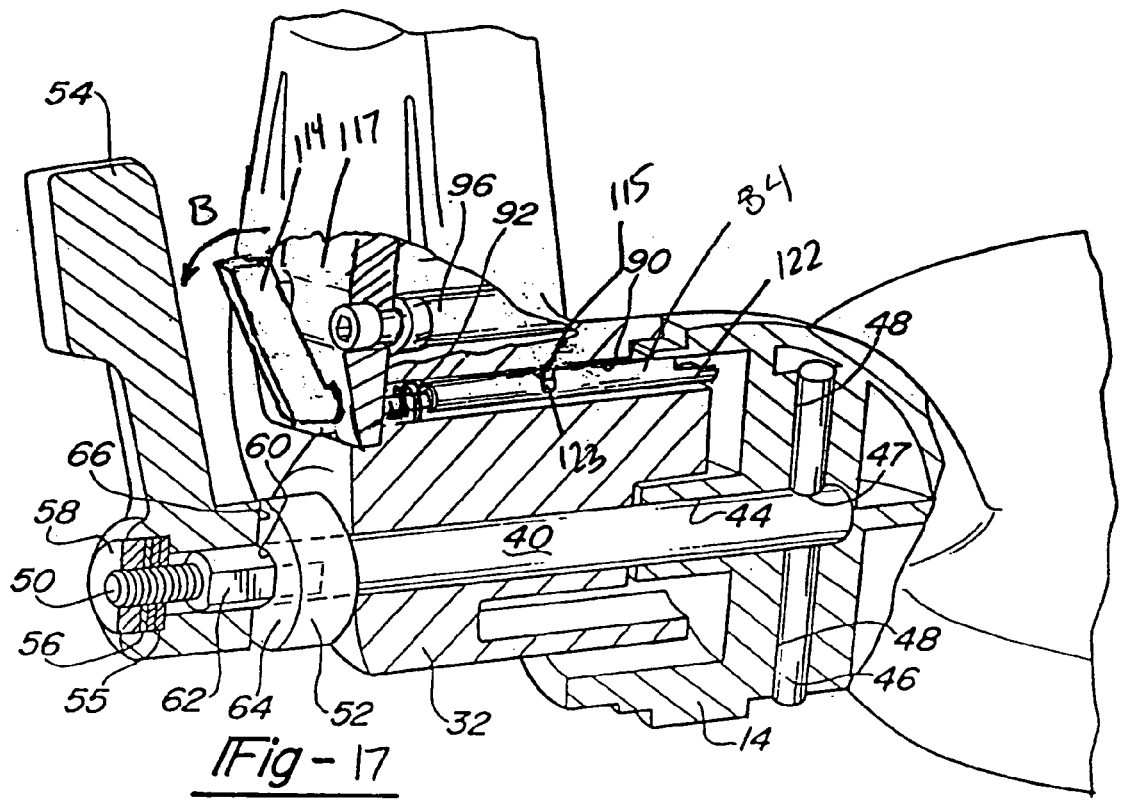
FIG. 17 is a partial cross-section perspective view of a fifth embodiment of the bevel stop mechanism.
Figure 18:
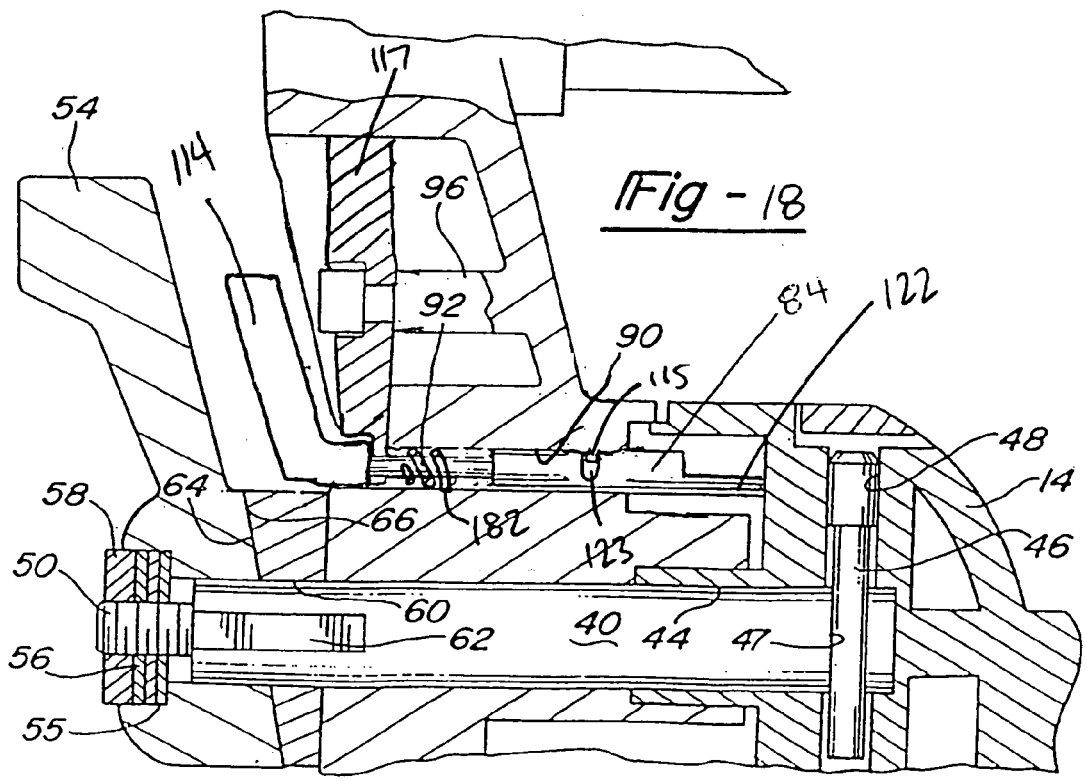
FIG. 18 is a cross-sectional side view of the fifth embodiment of the bevel stop mechanism shown in FIG. 17.
Figure 19:
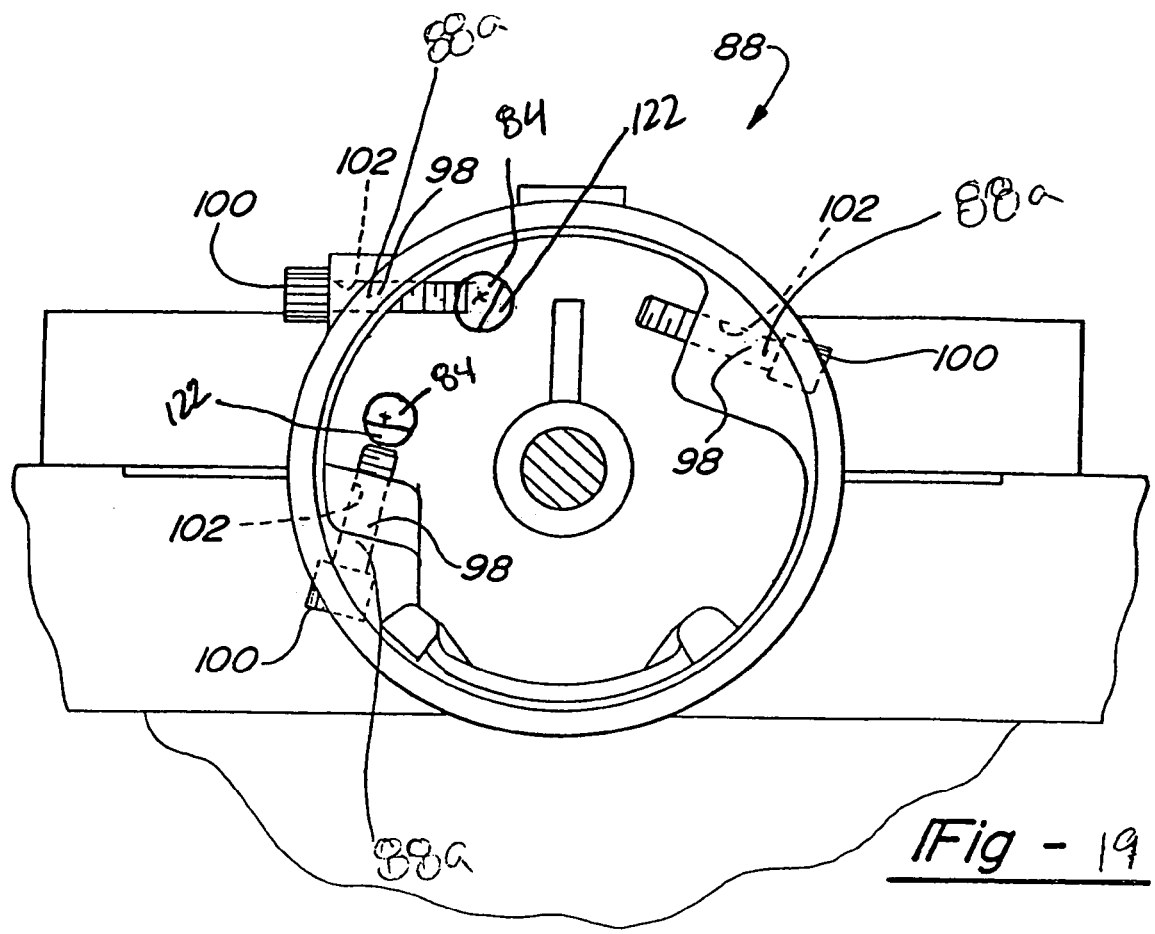
FIG. 19 is an end view of the base or table assembly illustrating the adjustment feature provided for the bevel stop mechanism shown in FIGS. 17 and 18.

Referring to FIGS. 17 through 19, a fifth embodiment of positive stop system 72 comprises a biasing spring 182, a stop rod 84, an override handle 114 and a stop system 88, preferably the stop system shown in FIG. 8. Biasing spring 182 is attached to stop rod 84 at one end and to the housing 32 at another end.

The housing 32 has a plaque 117, which may be built separate to or integrated with the housing 32. A reduced diameter portion 92 of rod 84 extends through housing 32 and is inserted through a slot in plaque 117. A handle 114 is then attached to the portion of rod 84 extending through plaque 117.

Further, stop rod 84 has a radial groove 123 disposed on its body, that engages a stop 115 in housing 32. The combination of the groove 123 and the stop 115 ensure that the rod 84 moves rotationally, rather than axially. Persons skilled in the art will recognize other means to achieve the same function.

Stop rod 84 has a step 122 at its distal end. As shown in FIG. 19, the step 122 is provided so that, upon rotation of rod 84, the step 122 will either bypass or contact the stop 88*a*. The spring 182 biases the rod 84 towards a contacting position.

Accordingly, when the bevel angle needs to be changed, handle 54 is rotated to release housing 32 from table assembly 14 and override handle 114 is rotated, for example, in a counter-clockwise direction, i.e., along direction B, to rotate step 122 to a position at which step 122 does not contact bolt 100 or housing 98 when housing 32 is pivoted on shaft 40.

Persons skilled in the art will recognize that the spring 182 shown in FIGS. 17 and 18 is a rotational spring. Additionally, such persons will recognize that the same function, i.e., biasing stop rod into its stopped position, can be achieved by rotational springs disposed on the handle 114, which force the step 122 to rotate into contact with the stops 88*a*. Further, persons skilled in the art will recognize that other means, such as elastomeric materials and structures, can be utilized to bias the stop rod 84 into its contacting position.

Figure 20:
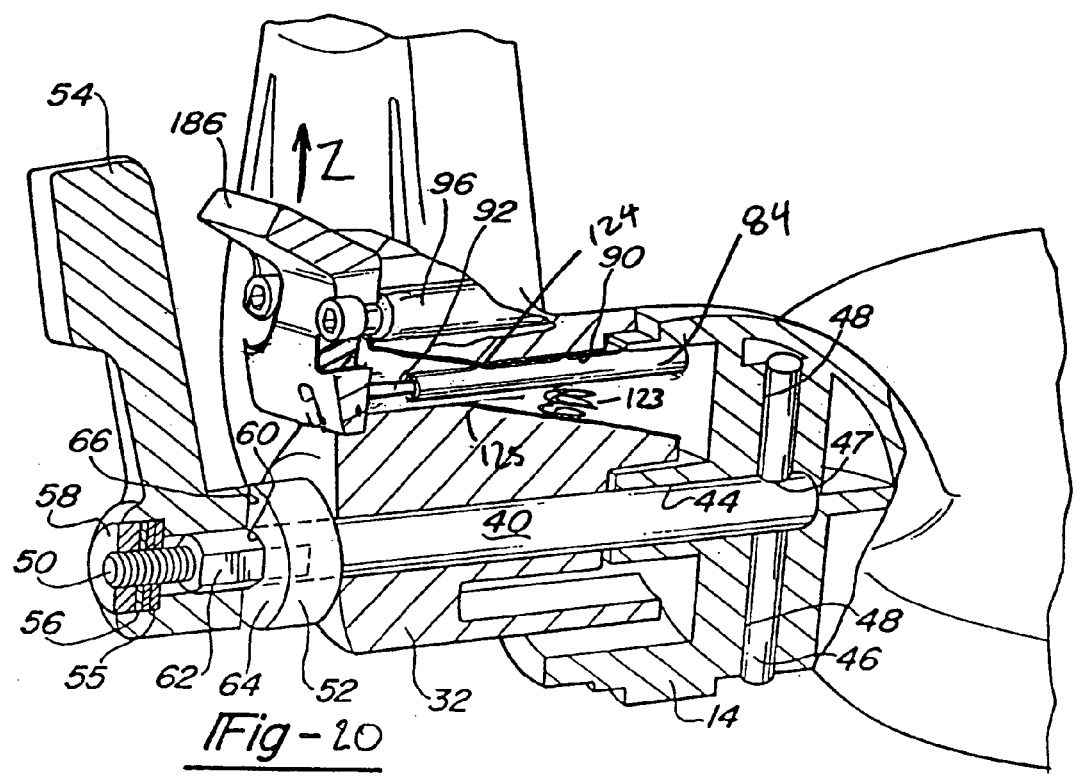
FIG. 20 is a partial cross-section perspective view of a sixth embodiment of the bevel stop mechanism.
Figure 21:
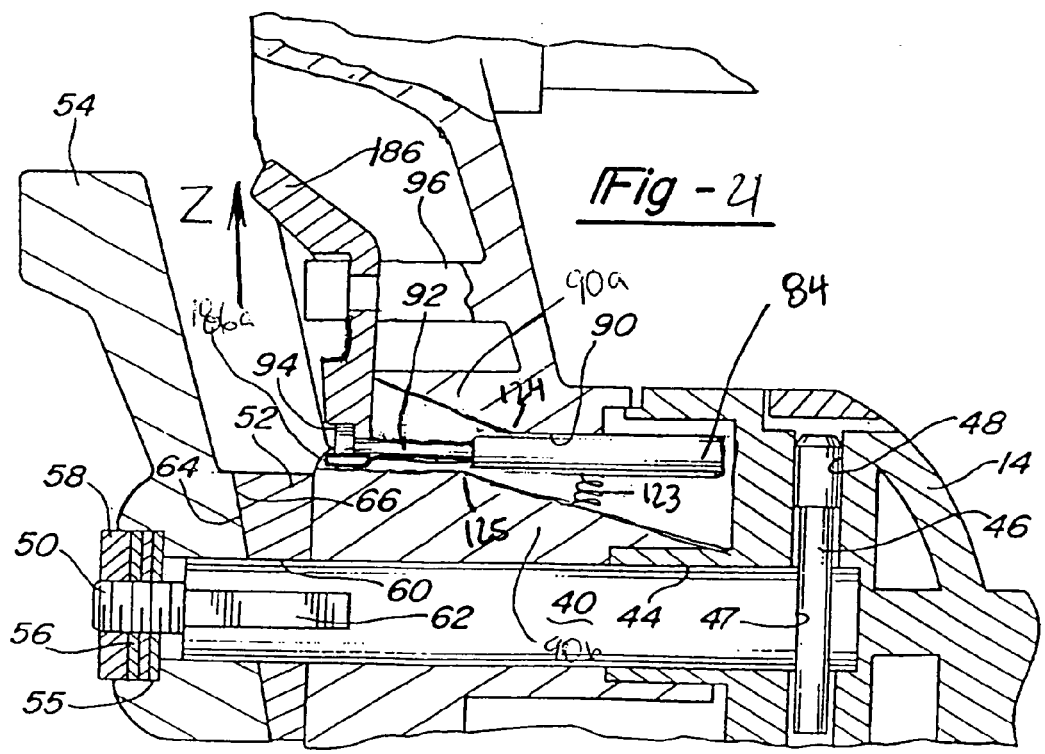
FIG. 21 is a cross-sectional side view of the sixth embodiment of the bevel stop mechanism shown in FIG. 20.

Referring to FIGS. 20 and 21, a sixth embodiment of positive stop system 72 comprises a biasing spring 123, a stop rod 84, an override lever 186 and a stop system 88, preferably the stop system shown in FIG. 8. The stop rod 84 is disposed between pivot points 124 and 125. As shown in FIGS. 20 and 21, the housing includes two inclined surfaces 90*a* and 90*b*, which in conjunction with pivot points 124 and 125, allow radial movement of the stop rod 84 about the pivot points. Biasing spring 123 is attached to stop rod 84 at one end and to the housing 32 at another end.

A reduced diameter portion 92 of rod 84 extends through housing 32 and is inserted through a slot 94 in override lever 186. The lever 186 has a lower lip 186*a*, which contacts the portion 92. In addition, the lever 186 is slidably attached to posts 96.

Accordingly, when the bevel angle needs to be changed, handle 54 is rotated to release housing 32 from table assembly 14 and override lever 186 is pulled in an upward direction, i.e., along direction Z, to rotate rod 84 about pivot points 124 and 125 to a position at which rod does not contact bolt 100 or housing 98 when housing 32 is pivoted on shaft 40.

Persons skilled in the art will recognize that the spring 182 shown in FIGS. 17 and 18 is a compression spring. Additionally, such persons will recognize that the same function, i.e., biasing stop rod 84 into its stopped position, can be achieved by linear spring pushing or pulling lever 186. Further, persons skilled in the art will recognize that other means, such as elastomeric materials and structures, can be utilized to bias the stop rod 84 into its stopping position.

Figure 22:
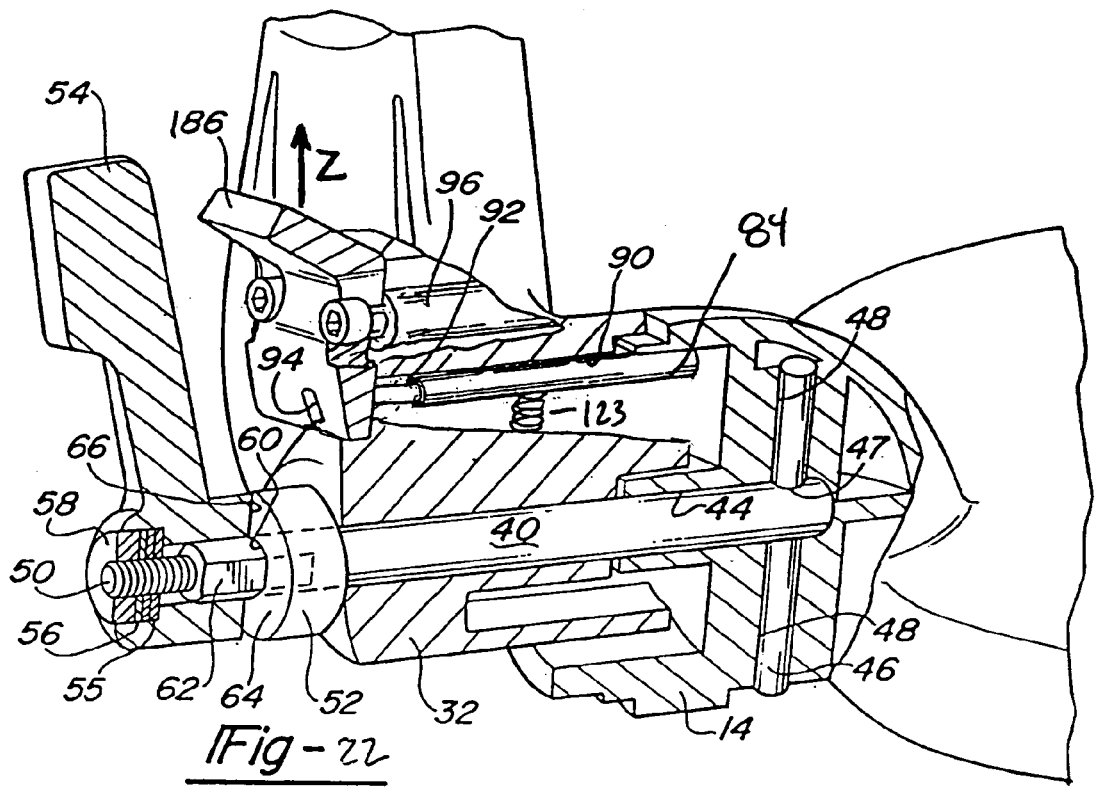
FIG. 22 is a partial cross-section perspective view of a seventh embodiment of the bevel stop mechanism.
Figure 23:
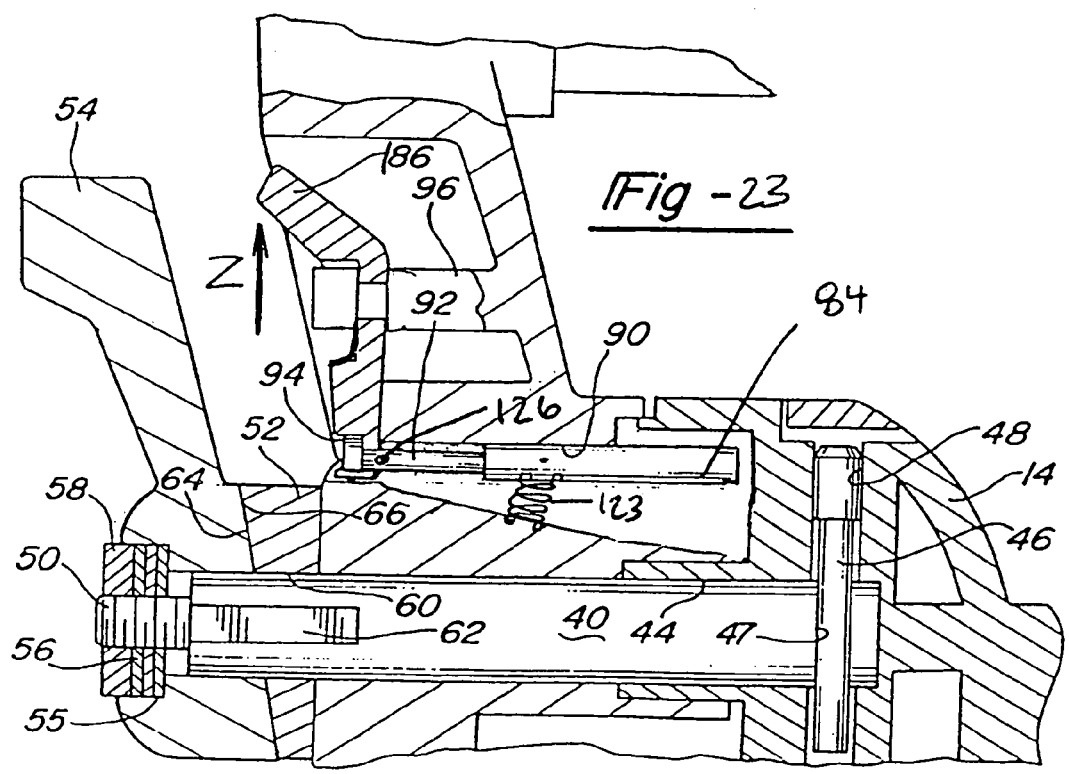
FIG. 23 is a cross-sectional side view of the seventh embodiment of the bevel stop mechanism shown in FIG. 22.

Referring to FIGS. 22 and 23, a seventh embodiment of positive stop system 72 comprises, like the embodiment illustrated in FIGS. 20 and 21, a biasing spring 123, a stop rod 84, an override lever 186 and a stop system, preferably the stop system shown in FIG. 8. The arrangement and operation of the seventh embodiment is similar to the one illustrated in FIGS. 20 and 21. Accordingly, the description of the sixth embodiment should be referred to when studying this embodiment.

Unlike in the sixth embodiment, pivot points 124 and 125 are not present. Instead, the stop rod 84 has a pivot pin 126 about which the stop rod 84 rotates. Accordingly, operation of the seventh embodiment is similar to that of the embodiment shown in FIGS. 20 and 21.

Figure 24:
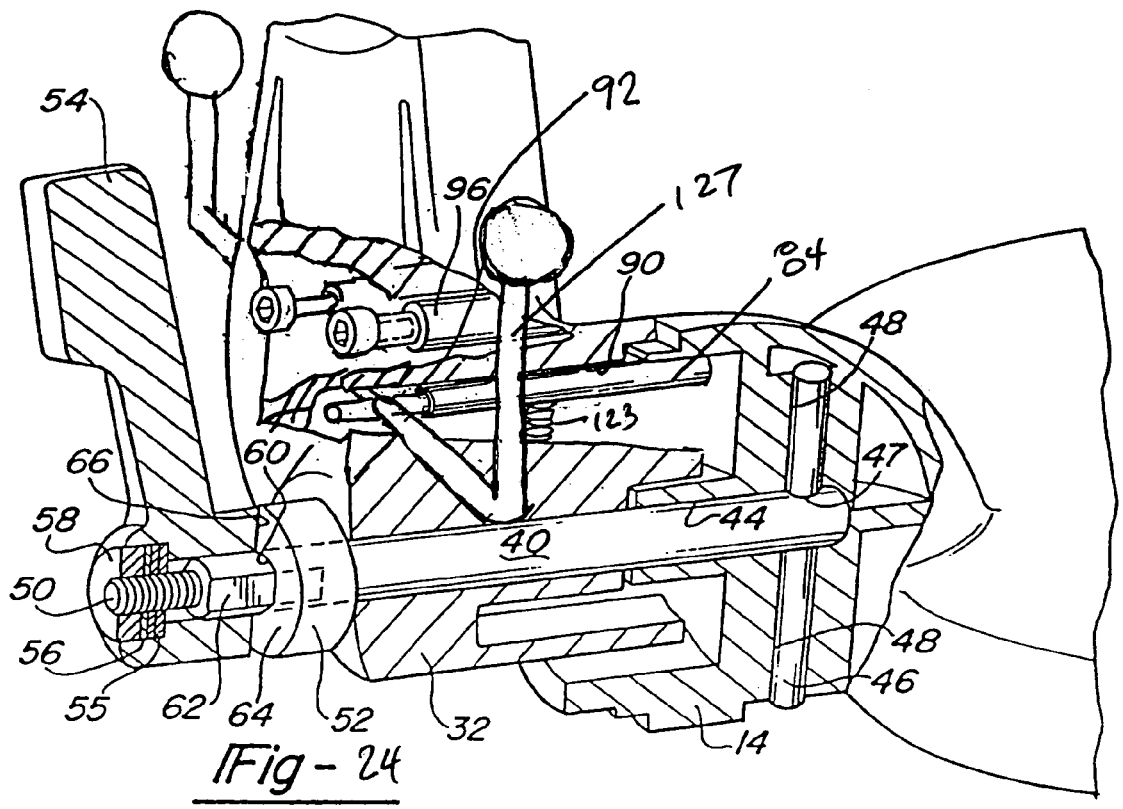
FIG. 24 is a partial cross-section perspective view of an eighth second embodiment of the bevel stop mechanism.
Figure 25:
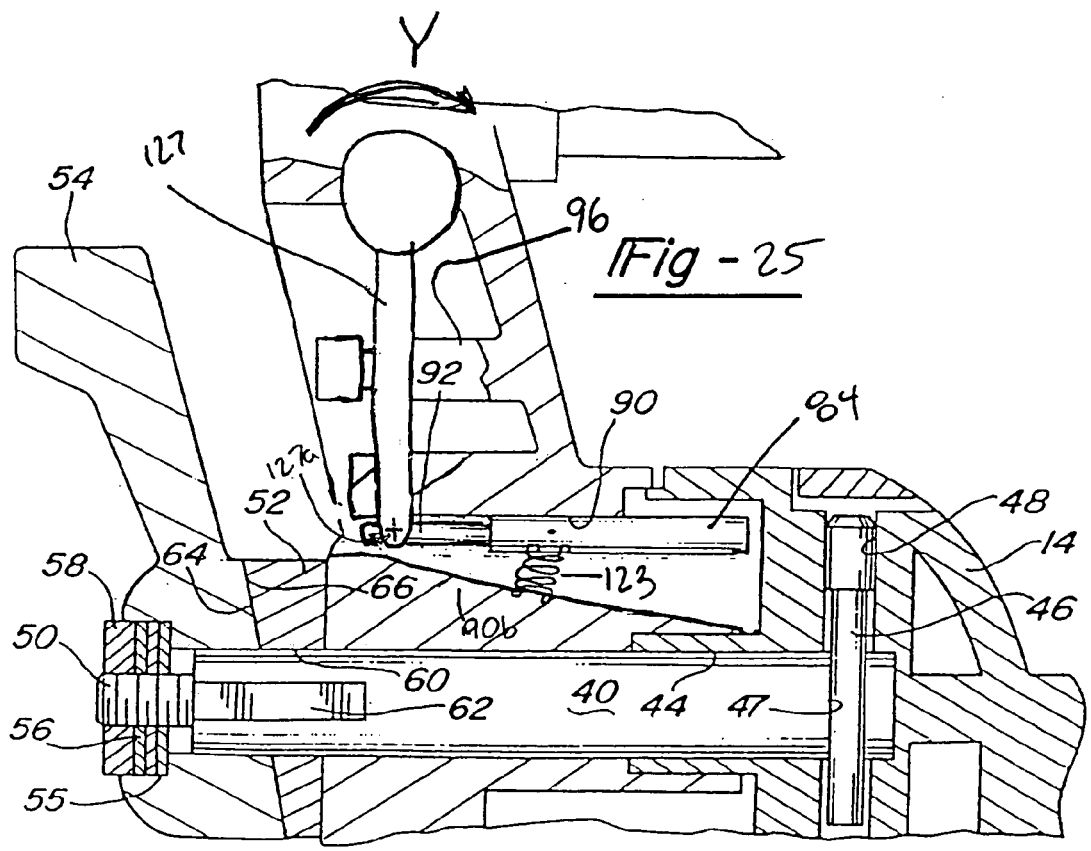
FIG. 25 is a cross-sectional side view of the eighth embodiment of the bevel stop mechanism shown in FIG. 24.

Referring to FIGS. 24 and 25, an eighth embodiment of positive stop system 72 comprises a biasing spring 123, a stop rod 84, an override lever 127 and a stop system 88, preferably the stop system shown in FIG. 8. The stop rod 84 is connected to the override lever 127 at a pivot axis 127*a*. As shown in FIGS. 20 and 21, the housing includes an inclined surface 90*b*, which in conjunction with radial movement of override lever 127 about pivot axis 127*a*, allows radial movement of the stop rod 84 about the pivot axis 127*a*. Biasing spring 123 is attached to stop rod 84 at one end and to the housing 32 at another end.

Accordingly, when the bevel angle needs to be changed, handle 54 is rotated to release housing 32 from table assembly 14 and override lever 127 is rotated, for example, in a clockwise direction, i.e., along direction Y, to rotate rod 84 about pivot axis 127*a* to a position at which rod does not contact bolt 100 or housing 98 when housing 32 is pivoted on shaft 40.

Persons skilled in the art will recognize that the spring 123 shown in FIGS. 24 and 25 is a compression spring. Additionally, such persons will recognize that the same function, i.e., biasing stop rod 84 into its stopped position, can be achieved by a rotational spring pushing or pulling lever 127. Further, persons skilled in the art will recognize that other means, such as elastomeric materials and structures, can be utilized to bias the stop rod 84 into its stopping position.

Referring to FIGS. 26 through 30, positive stop system 72 comprises a biasing spring 82, a stop rod 84, and an overridable, adjustable stop system 88'. Biasing spring 82 is inserted into a stepped aperture 90 extending through support housing 32 such that it abuts the step formed within aperture 90. Stop rod 84 is then inserted through spring 82 and through aperture 90 trapping spring 82 between rod 84 and stepped aperture 90.

The housing 32 has a plaque 117, which may be built separate to or integrated with the housing 32. A reduced diameter portion 92 of rod 84 extends through housing 32 and is inserted through a slot in plaque 117.

Figure 26:
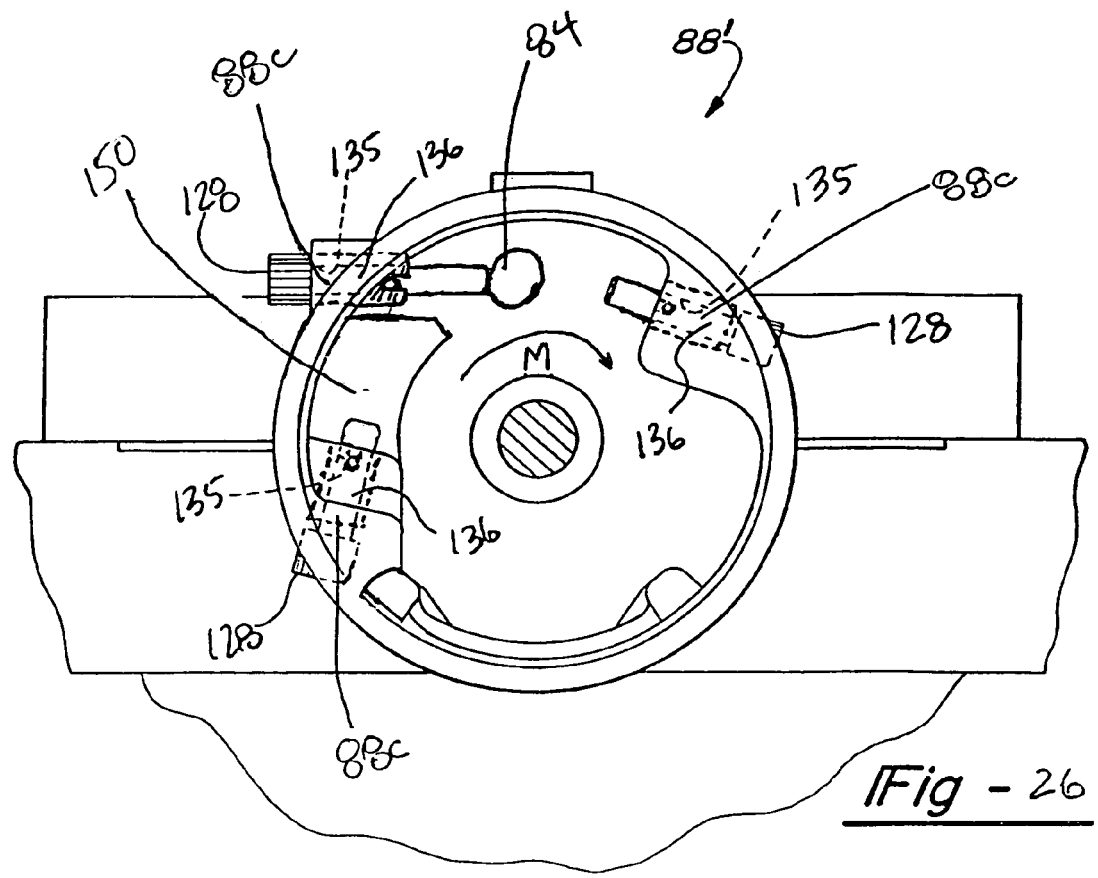
FIG. 26 is an end view of the base or table assembly illustrating a ninth embodiment of the bevel stop mechanism.
Figure 27:
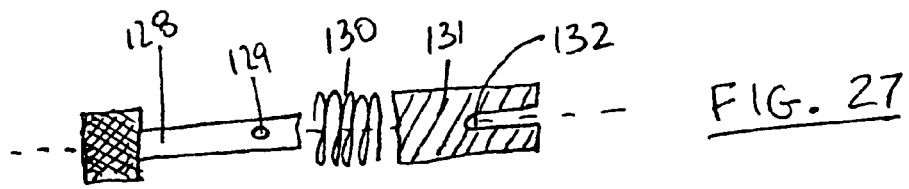
FIG. 27 is an exploded side view of the pin assembly used in the ninth embodiment of the bevel stop mechanism shown in FIG. 26.
Figure 28:
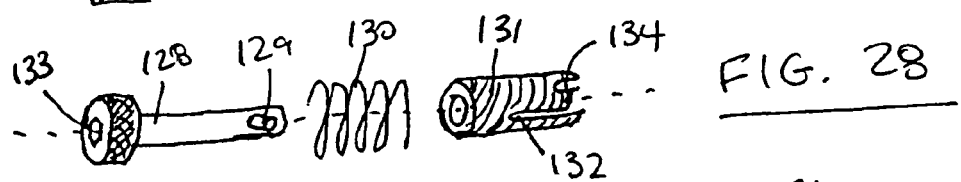
FIG. 28 is an exploded perspective view of the pin assembly used in the ninth embodiment of the bevel stop mechanism shown in FIG. 26.

When located in its stopped position, stop rod 84 extends out of housing 32 and into table assembly 14 such that it can engage one of the plurality of adjustable stops 88*c* shown in FIG. 26. Table assembly 14 is shown having an adjustable stop 88*c* located at about a 0° bevel angle and at a bevel angle of about 45° on both sides of center.

Each adjustable stop 88*c* preferably has a threaded body 131, a stop pin 128 disposed within the threaded body 131, and a pin 129 at a distal end of the stop pin 128. In addition, the adjustable stop 88*c* preferably has a spring 130 disposed between the stop pin 128 and the threaded body 131. The threaded body 131 preferably has a long channel 132, along which the pin 129 can slide.

Figure 29A:
FIG. 29a shows the pin assembly in the expanded position and FIG. 29b shows the pin assembly in the retracted position.
Figure 29B:
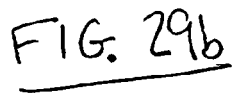

As shown in FIG. 29*b*, the stop pin 128 can be retracted by pulling out the stop pin 128 from the threaded body 131, until the pin 129 contacts the end of the channel 132. In order to put the stop pin 128 in the stopping position, the stop pin 128 is pushed into the threaded body 131. The pin 129 will maintain the stop pin in the stopping position by riding along the edge of the threaded body 131. However, it may be preferable to provide a short channel 134 on the threaded body 131, where the pin 129 can lock into, as shown in FIG. 29*a*. The spring 130 will ensure that the pin 129 is kept at the end of the respective channel.

In addition, each adjustable stop 88*c* includes a housing 136. Each housing 136 is shown as an integral part of table assembly 14 but it is within the scope of the present invention to manufacture individual housings 136 and secure them to table assembly 14 if desired. Each housing 136 defines a threaded through bore 135 into which the threaded body 131 is threadably received. The stop pin 128 provides a surface for stop rod 84 to contact when the bevel angle of housing 32 is located at about 0° or about ±45° from the 0° bevel angle as is shown in the preferred embodiment.

The adjustability of each stop 88c is provided by the threaded connection between the threaded body 131 and housing 98 and this adjustability allows the operator to accurately set these specific bevel angles. An operator need only to lock the stop pin 128 in either channel, and lodge a wrench into cavity 133 to adjust the bevel angles.

When the bevel angle needs to be changed, handle 54 is rotated to release housing 32 from table assembly 14 and stop pin 128 is rotated so that pin 129 leaves the channel 134 and slides along channel 132. Stop pin 128 is pulled out until the pin 129 hits the end of channel 132. The stop rod 84 thus does not contact stop pin 128 or housing 98 when housing 32 is pivoted on shaft 40. If the operator wants to return the stop pin 128 into the stopping position, the operator needs only to push and rotate the stop pin 128 so that pin 129 lodges itself within channel 134.

The table assembly 14 may further be provided with a ramp 150. The ramp 150 contacts the stop rod 84 when the miter saw is beveled in a clockwise direction M, i.e., from the −45° bevel angle towards the +45° bevel angle, so that the stop rod 84 retracts and bypasses the 0° bolt.

Persons skilled in the art will recognize that the present embodiment may be implemented with the override button 86 illustrated in FIGS. 6 and 7, instead of plaque 117. This would allow the operator to withdraw the stop rod 84 to bypass the adjustable stops 88c and/or to disable the adjustable stops 88c. Furthermore, if the override button 86 is used, the adjustable stops 88c may be replaced with the adjustable stops 88a.

Persons skilled in the art will also recognize that spring 130 need not be disposed between stop pin 128 and threaded body 131. Instead, the spring 130 may be disposed between the stop pin 128 and the table 14.

Persons skilled in the art may also recognize that the stop rod 84 may be fixed or may even be a casting in the housing 32 which extends into the table 14.

Figure 33:
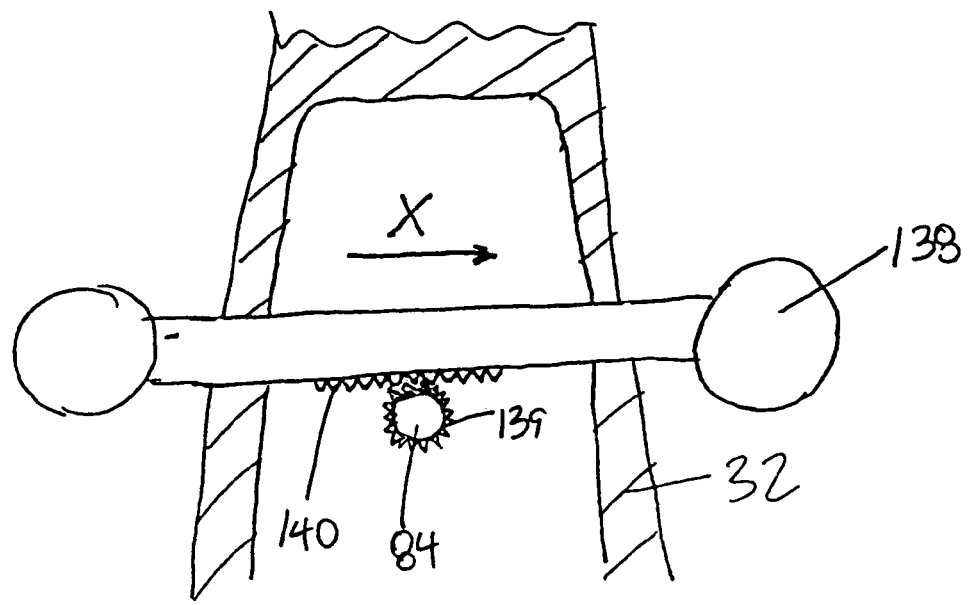
FIG. 33 is a cross-sectional view of the tenth embodiment of the bevel stop mechanism shown in FIGS. 31 and 32, along a line D—D shown in FIG. 32.
Figure 30:
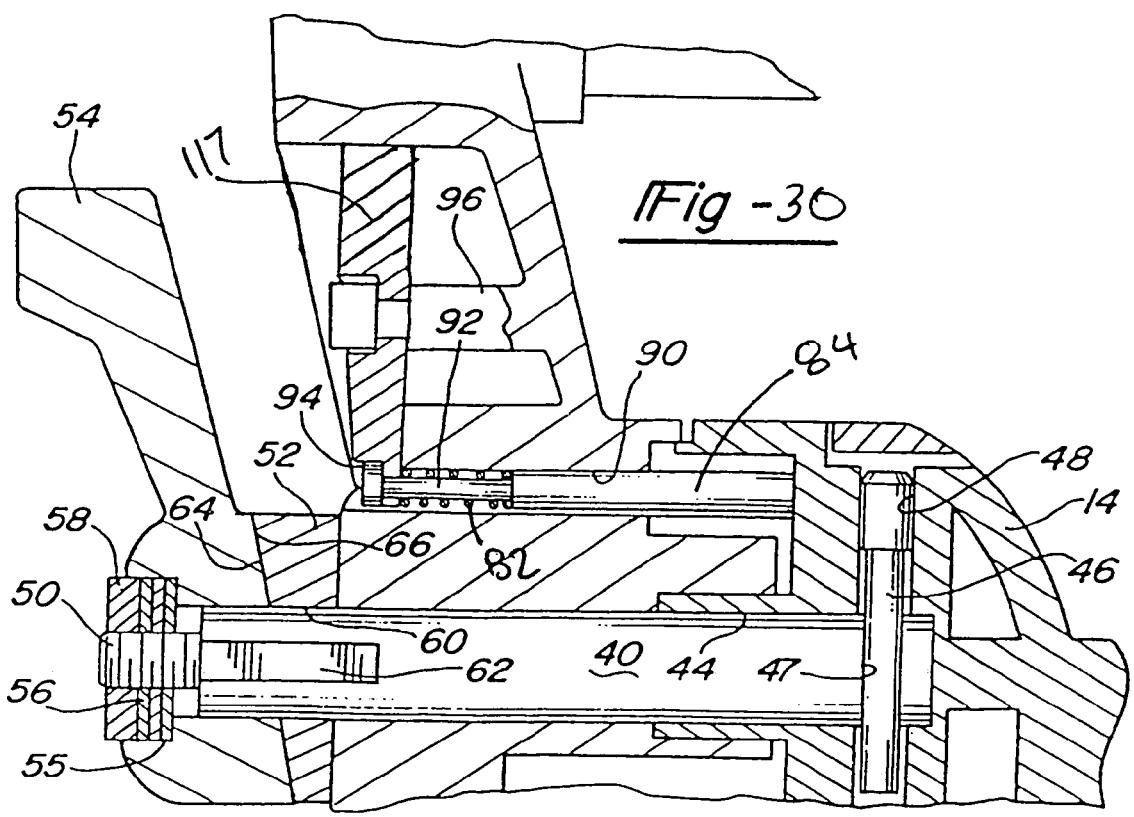
FIG. 30 is a cross-sectional side view of the rod assembly used in conjunction with the ninth embodiment of the bevel stop mechanism shown in FIG. 26.
Figure 31:
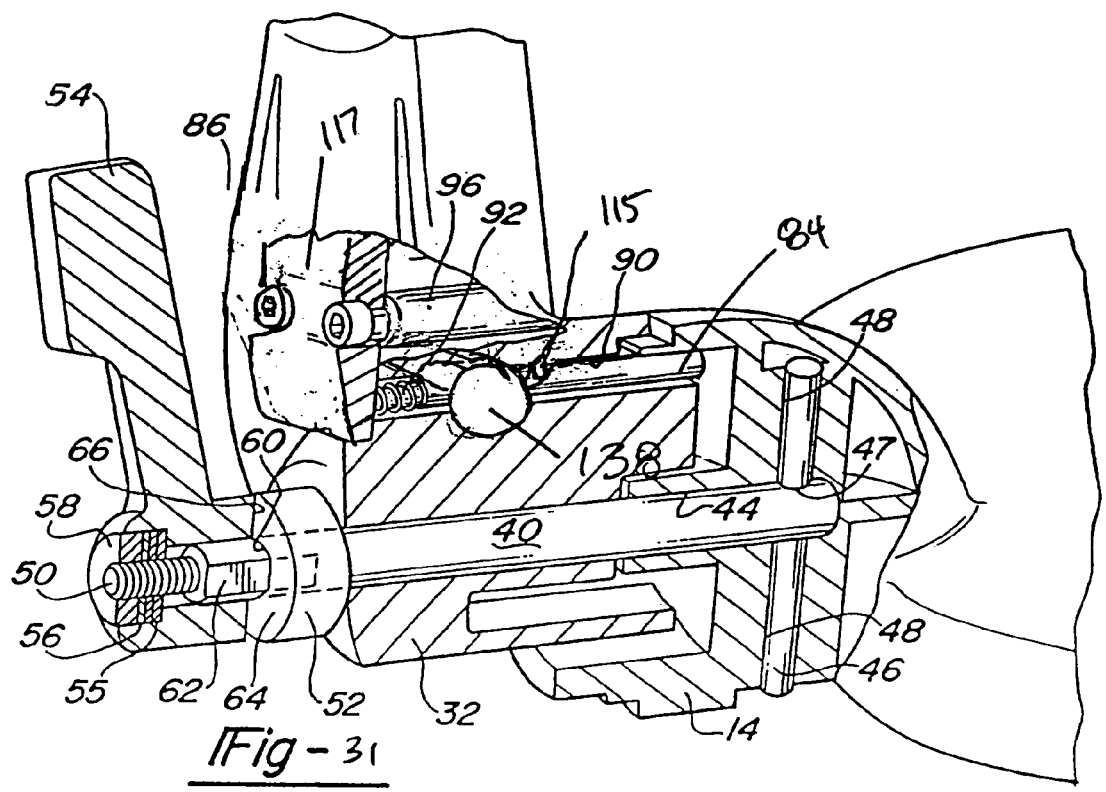
FIG. 31 is a partial cross-section perspective view of a tenth embodiment of the bevel stop mechanism.
Figure 32:
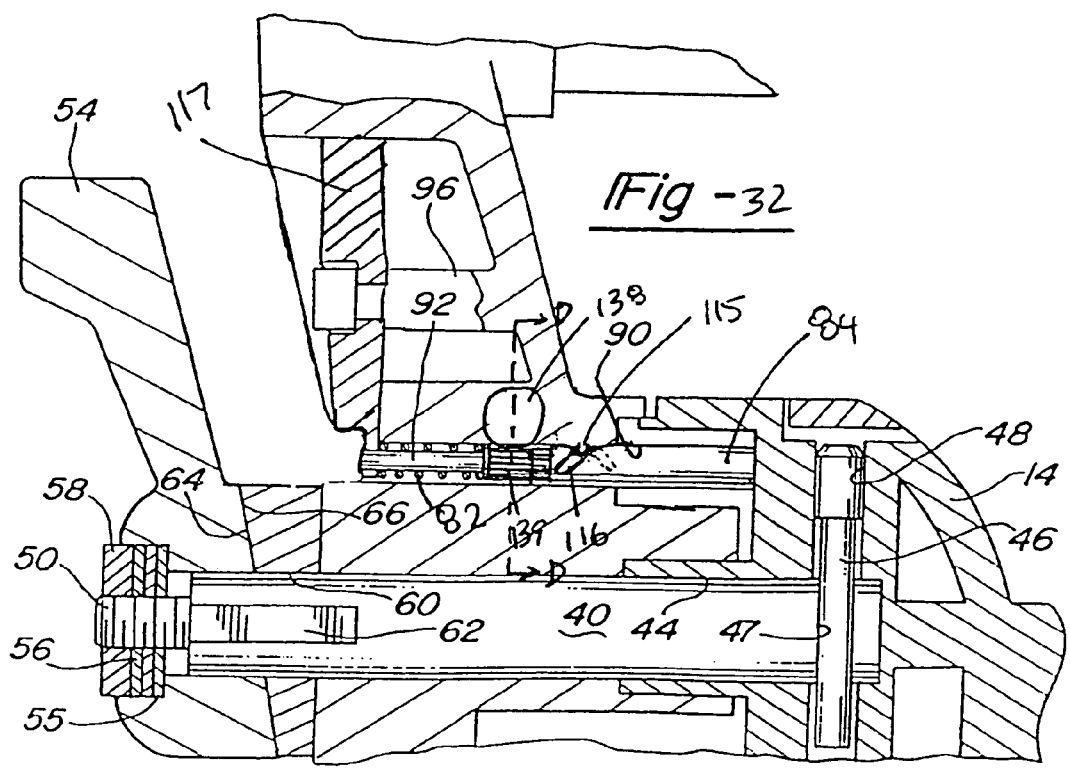
FIG. 32 is a cross-sectional side view of the tenth embodiment of the bevel stop mechanism shown in FIG. 31.

Referring to FIGS. 31 through 33, a tenth embodiment of positive stop system 72 comprises a biasing spring 82, a stop rod 84 and a stop system, preferably one of the stop systems shown in FIGS. 8 through 10. Biasing spring 82 is inserted into a stepped aperture 90 extending through the housing 32 such that it abuts the step formed within aperture 90. Stop rod 84 is then inserted through spring 82 and through aperture 90.

The housing 32 has a plaque 117, which may be built separate to or integrated with the housing 32. Spring 82 is trapped between plaque 117 and the stop rod 84. A reduced diameter portion 92 of rod 84 extends through housing 32 and is inserted through a slot in plaque 117.

An override rod 138 is provided through the housing 32. The axis of the override rod 138 is preferably substantially perpendicular to the axis of the stop rod 84. As shown in FIG. 33, the override rod 138 is provided with a rack 140 of teeth, which engage a pinion section 139 of the stop rod 84.

Further, stop rod 84 has a helical groove 116 disposed on its body, that engages a stop 115 in housing 32. Accordingly, linear movement of the override rod 138, for example, along direction X, will cause the rotation of stop rod 84. Because of the engagement between the stop 115 and the rod groove 116, stop rod 84 moves axially while rotating, as in a screwing action, within housing 32 between a stop position and a release position with spring 82 biasing stop rod 84 into its stopped position.

Persons skilled in the art will recognize that the spring 82 shown in FIGS. 31 and 32 is a compression spring. Additionally, such persons will recognize that the same function, i.e., biasing stop rod 84 into its stopped position, can be achieved by rotational springs disposed on the stop rod 84, or linear springs which bias the override rod 138 in the direction opposite to direction X, which force the rod 84 to rotate. Further, persons skilled in the art will recognize that other means, such as elastomeric materials and structures, can be utilized to bias the stop rod 84 into its stopped position.

Figure 34:
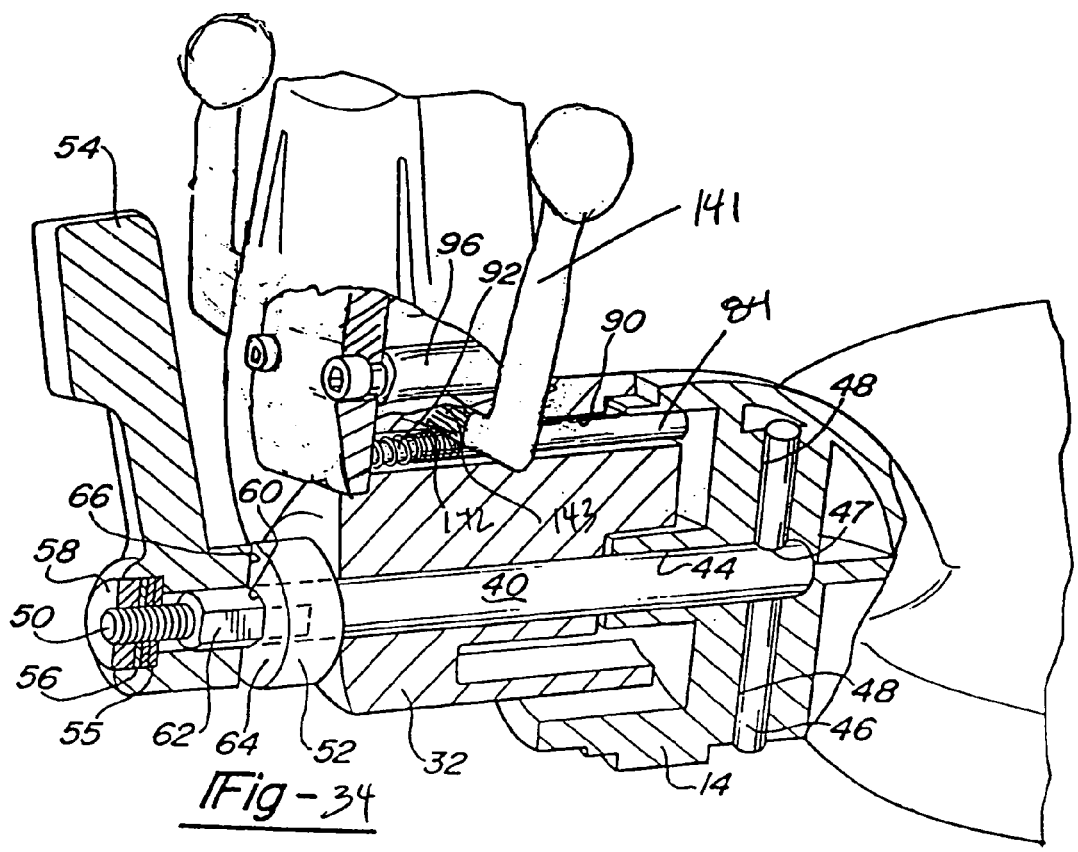
FIG. 34 is a partial cross-section perspective view of a eleventh embodiment of the bevel stop mechanism.
Figure 35:
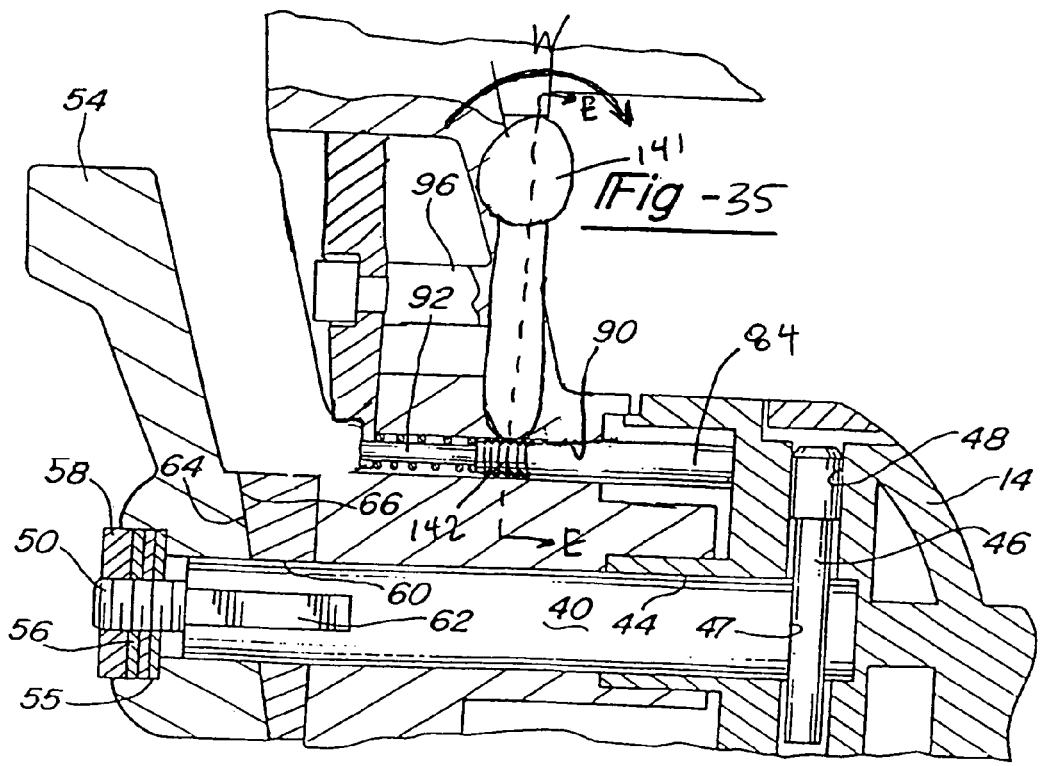
FIG. 35 is across-sectional side view of the eleventh embodiment of the bevel stop mechanism shown in FIG. 34.
Figure 36:
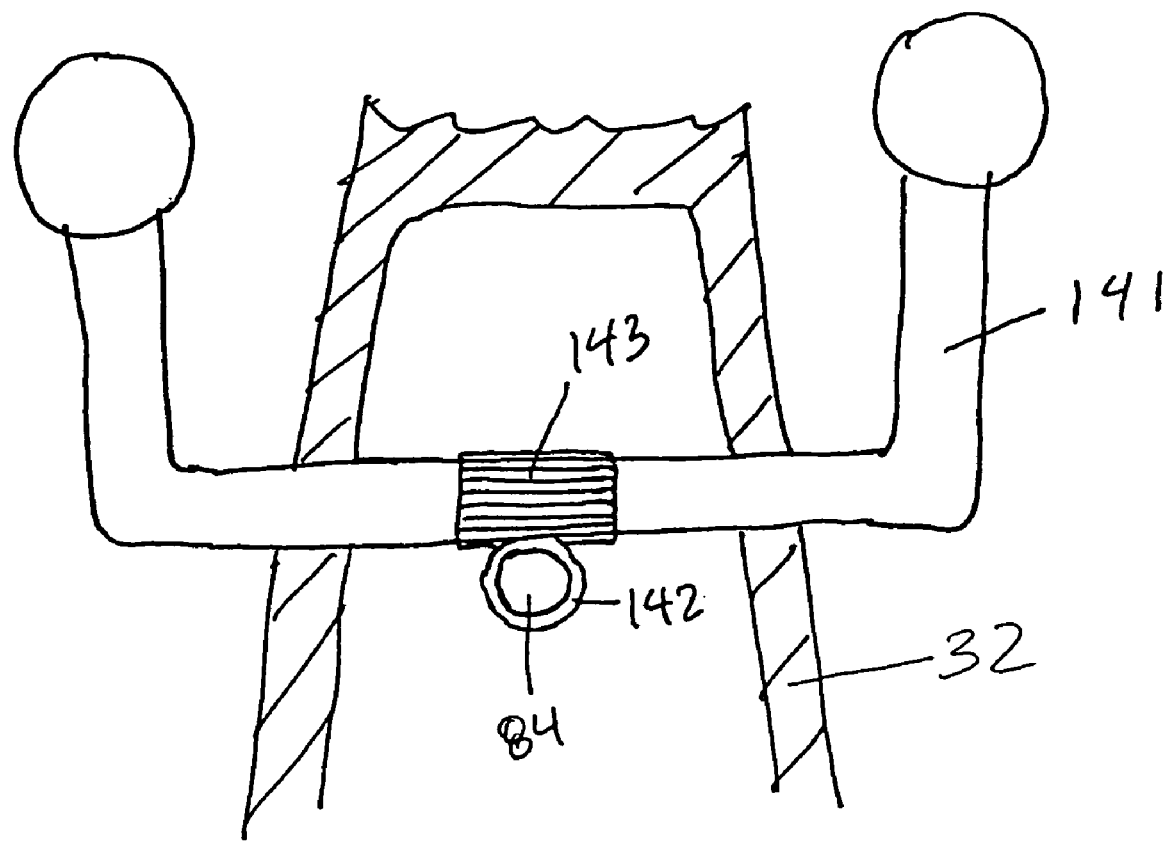
FIG. 36 is a cross-sectional view of the tenth embodiment of the bevel stop mechanism shown in FIGS. 34 and 35, along a line E—E shown in FIG. 35.

Referring to FIGS. 34 through 36, an eleventh embodiment of positive stop system 72 comprises a biasing spring 82, a stop rod 84 and a stop system, preferably one of the stop systems shown in FIGS. 8 through 10. Biasing spring 82 is inserted into a stepped aperture 90 extending through the housing 32 such that it abuts the step formed within aperture 90. Stop rod 84 is then inserted through spring 82 and through aperture 90.

The housing 32 has a plaque 117, which may be built separate to or integrated with the housing 32. Spring 82 is trapped between plaque 117 and the stop rod 84. A reduced diameter portion 92 of rod 84 extends through housing 32 and is inserted through a slot in plaque 117.

An override lever 141 is provided through the housing 32. The rotational axis of the override lever 141 is preferably substantially perpendicular to the axis of the stop rod 84. As shown in FIG. 36, the override lever 141 is provided with a pinion section 143, which engages a rack 142 of teeth disposed on the stop rod 84.

Accordingly, because of the engagement of the rack 142 and pinion 143, rotational movement of the override lever 138, for example, along direction W, is converted into linear movement of stop rod 84. Thus, stop rod 84 moves axially within housing 32 between a stop position and a release position with spring 82 biasing stop rod 84 into its stopped position.

Persons skilled in the art will recognize that the spring 82 shown in FIGS. 34 and 35 is a compression spring. Additionally, such persons will recognize that the same function, i.e., biasing stop rod 84 into its stopped position, can be achieved by rotational springs disposed on the stop rod 84 and/or on the override lever 141. Further, persons skilled in the art will recognize that other means, such as elastomeric materials and structures, can be utilized to bias the stop rod 84 into its stopped position.

The above detailed description describes different embodiments of the present invention. Persons skilled in the art may recognize other alternatives to the means disclosed herein, such as using non-adjustable fixed castings instead of the adjustable stops 88a, or placing the adjustable stops 88a on the housing 32, while placing the stop rod 84, and/or the means to retract the rod, on the table 14. Similarly, persons skilled in the art will recognize that a knob can be placed on the stop rod 84 to manually withdraw it from the stopping position. However, all these additions and/or alterations are considered to be equivalents of the present invention

What is claimed is:

1. A saw comprising:
   a base;
   a table rotatably attached to the base, the table supporting a workpiece;
   a saw unit supporting a saw blade and having a motor for rotatably driving said saw blade;

a housing pivotally supporting said saw unit related to said table in such a manner that said saw unit is at least laterally pivotable about a rotational axis in both clockwise and counterclockwise directions; and a bevel mechanism for selectively determining the lateral position of said saw unit at any of a plurality of pivoted positions including a vertical position where said saw blade is positioned substantially vertically relative to said table;

said bevel mechanism comprising a rotatable rod and first, second and third fixed stop members, the rod being movable between the first and second fixed stop members to define a first range of pivoted positions when the rod is in a first rotated position, and the rod being movable between the first and third fixed stop members to define a second range of pivoted positions when the rod is in a second rotated position.

2. The saw of claim 1, wherein the rod has a longitudinal axis.

3. The saw of claim 2, wherein the rod is rotated between the first and second rotated positions about the longitudinal axis.

4. The saw of claim 1, wherein at least one of the first, second and third stop members is a bolt.

5. The saw of claim 1, wherein the table rotates about a vertical axis, relative to the base.

* * * * *